United States Patent
Suzuki et al.

(10) Patent No.: US 10,157,027 B2
(45) Date of Patent: Dec. 18, 2018

(54) INFORMATION PROCESSING APPARATUS THAT EXECUTES PRINTING BASED ON WHETHER DRAWN DATA INCLUDES DATA FOR A PREDETERMINED ELEMENT, INFORMATION PROCESSING METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventors: Tomohiro Suzuki, Kawasaki (JP); Naoki Sumi, Kawasaki (JP); Kiyoshi Umeda, Kawasaki (JP); Hiroyuki Sakai, Chigasaki (JP); Yuki Omagari, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/632,547

(22) Filed: Jun. 26, 2017

(65) Prior Publication Data

US 2018/0004471 A1  Jan. 4, 2018

(30) Foreign Application Priority Data

Jul. 1, 2016 (JP) .................................. 2016-132015

(51) Int. Cl.
*G06F 15/00* (2006.01)
*G06F 3/12* (2006.01)
(Continued)

(52) U.S. Cl.
CPC ............ *G06F 3/1296* (2013.01); *G06F 3/121* (2013.01); *G06F 3/1243* (2013.01);
(Continued)

(58) Field of Classification Search
CPC ................ G06F 3/1296; G06F 3/1297; G06K 2215/008; H04N 1/00238
(Continued)

(56) References Cited

U.S. PATENT DOCUMENTS 9,069,511 B2   6/2015  Yamada
9,436,413 B2   9/2016  Mizoguchi et al.
(Continued)

FOREIGN PATENT DOCUMENTS

JP   2013-137622 A   7/2013

OTHER PUBLICATIONS

European Search Report issued in corresponding European Patent Application No. 17001073.0 dated Dec. 5, 2017.
(Continued)

*Primary Examiner* — Douglas Tran
(74) *Attorney, Agent, or Firm* — Venable LLP

(57) ABSTRACT

A drawing unit configured to draw a print target content is instructed to draw a content and a predetermined element. Based on a notification from the drawing unit, which corresponds to the drawing instruction and has been made regardless of completion of drawing to the instruction, drawn data is acquired from the drawing unit. If the acquired data includes the predetermined element, a print apparatus is caused to execute printing based on the acquired data. If the acquired data includes no predetermined element, data is acquired from the drawing unit again without causing the print apparatus to execute printing based on the acquired data.

20 Claims, 19 Drawing Sheets

(51) Int. Cl.
    *G06K 1/00*          (2006.01)
    *H04N 1/00*         (2006.01)

(52) U.S. Cl.
    CPC .......... *G06F 3/1292* (2013.01); *G06F 3/1297* (2013.01); *G06K 2215/008* (2013.01); *H04N 1/00238* (2013.01)

(58) Field of Classification Search
    USPC ........................ 358/1.15, 1.14, 1.13, 1.9, 1.1
    See application file for complete search history.

(56) References Cited

U.S. PATENT DOCUMENTS

| | | |
|---|---|---|
| 9,465,571 B2 | 10/2016 | Kato et al. |
| 9,471,284 B2 | 10/2016 | Kurokawa et al. |
| 9,582,232 B2 | 2/2017 | Umeda et al. |
| 9,628,636 B2 | 4/2017 | Yamada |
| 9,671,981 B2 | 6/2017 | Kunieda et al. |
| 9,671,984 B2 | 6/2017 | Sumi et al. |
| 9,678,700 B2 | 6/2017 | Goto et al. |
| 2009/0122341 A1* | 5/2009 | Natori .................. G06F 3/1205 358/1.15 |
| 2015/0363144 A1 | 12/2015 | Suzuki et al. |
| 2015/0365546 A1 | 12/2015 | Umeda et al. |
| 2015/0378643 A1 | 12/2015 | Sumi et al. |
| 2015/0379741 A1 | 12/2015 | Obayashi et al. |
| 2017/0118374 A1* | 4/2017 | Tsujiguchi ......... H04N 1/32133 |

OTHER PUBLICATIONS

Copending, unpublished U.S. Appl. No. 15/460,641 to Yuki Omagari, et al, filed Mar. 16, 2017.

\* cited by examiner

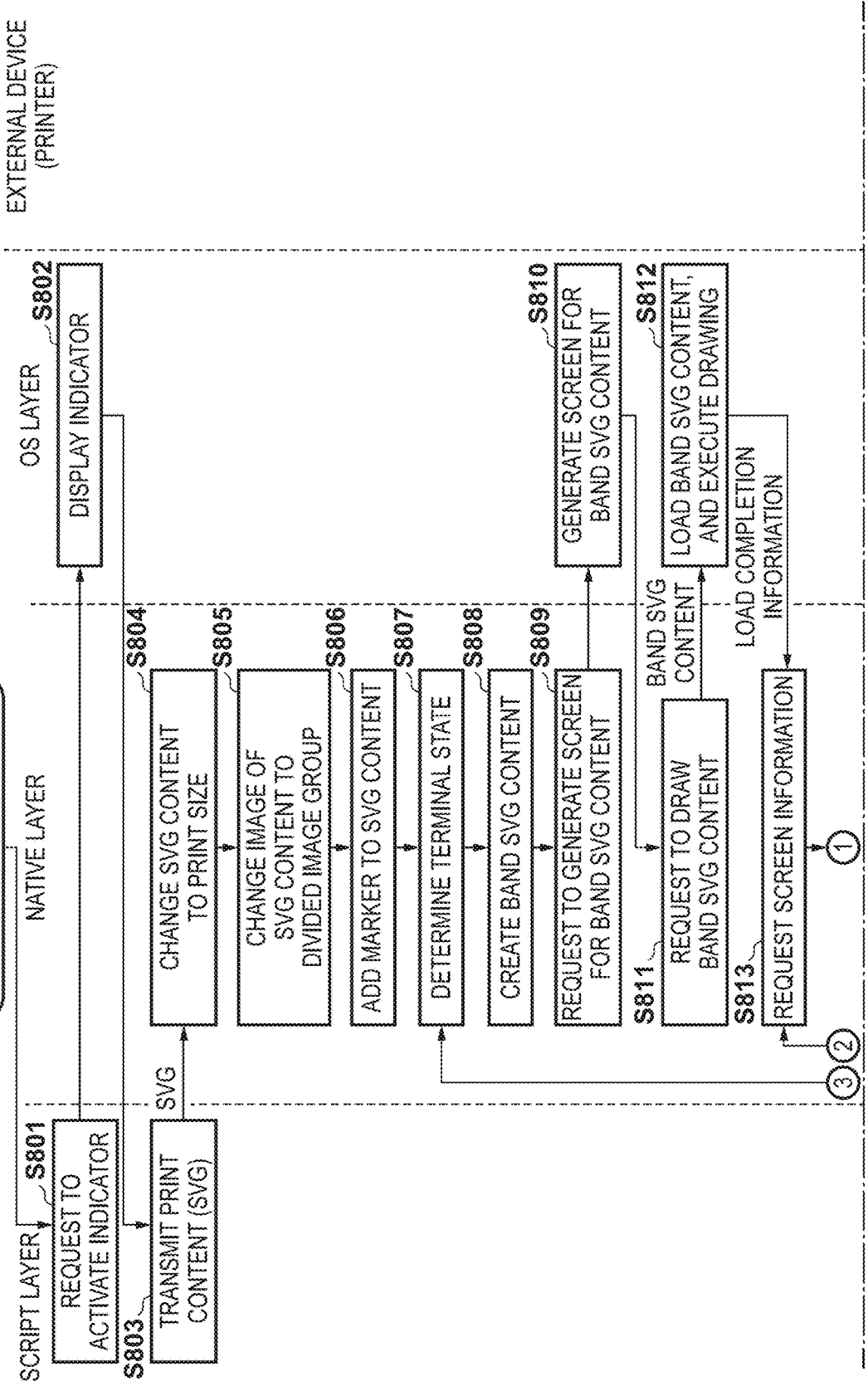

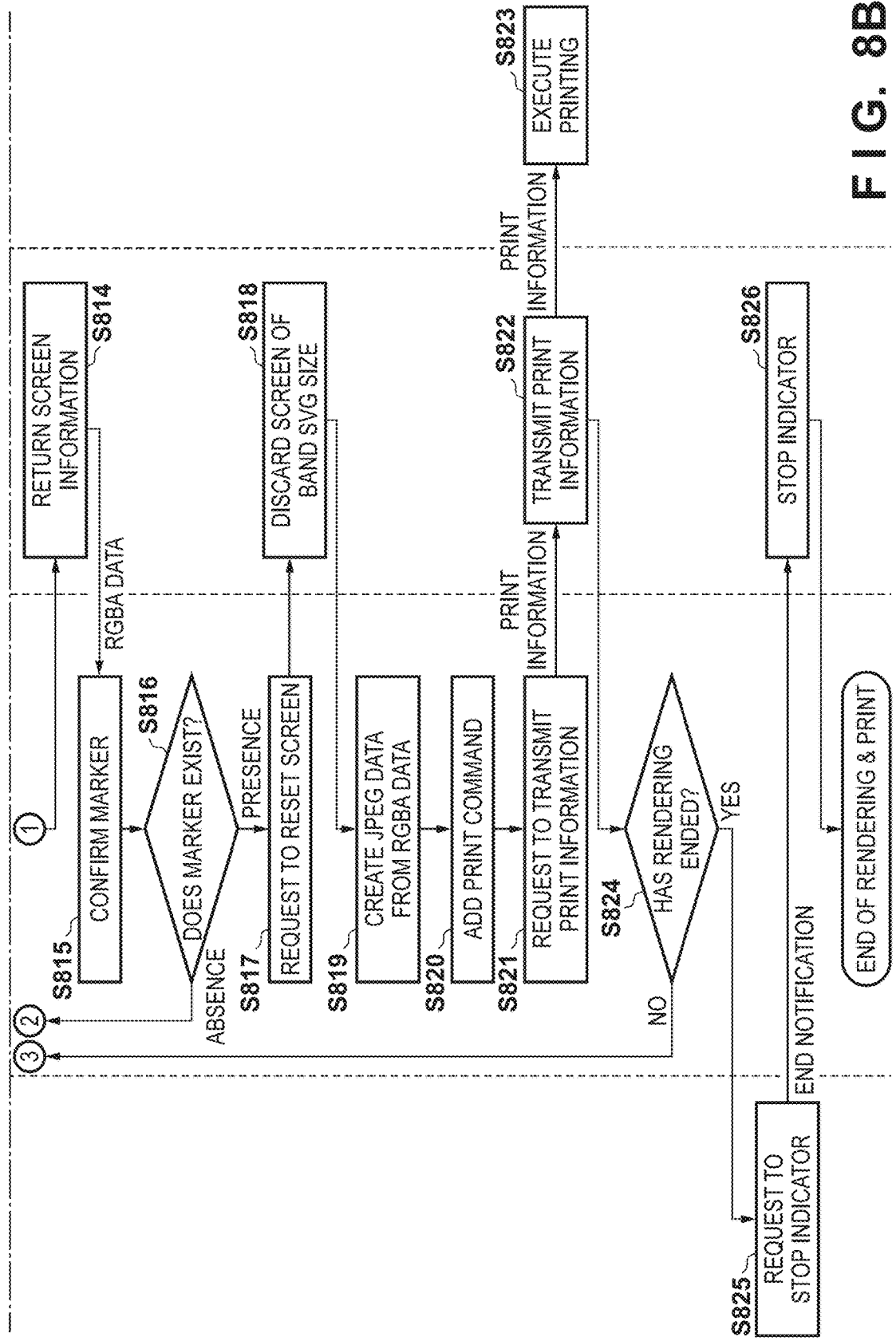

FIG. 11A
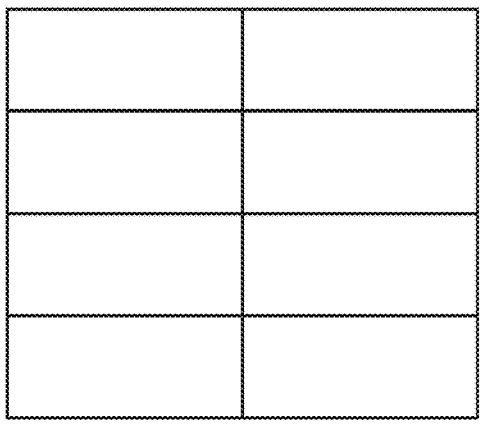
FIG. 11B
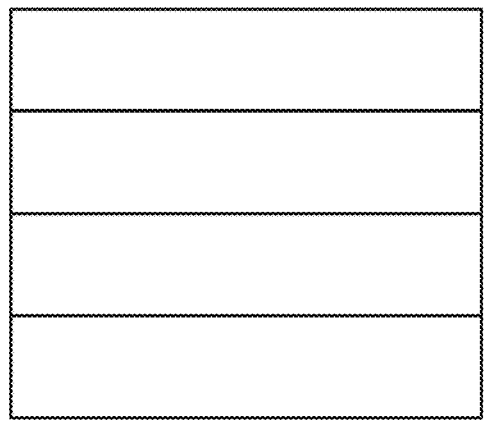
FIG. 12A
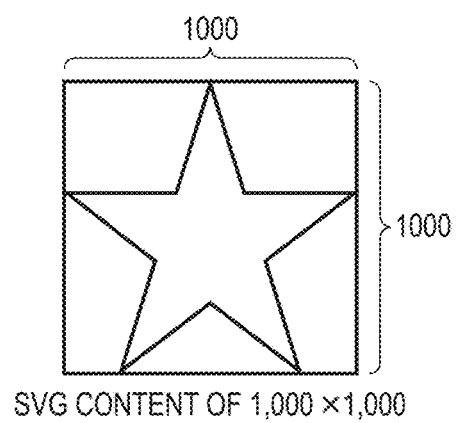
SVG CONTENT OF 1,000 × 1,000
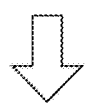
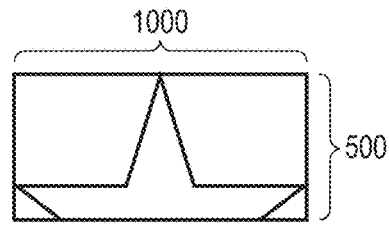
SVG DISPLAY SCREEN
FIG. 12B
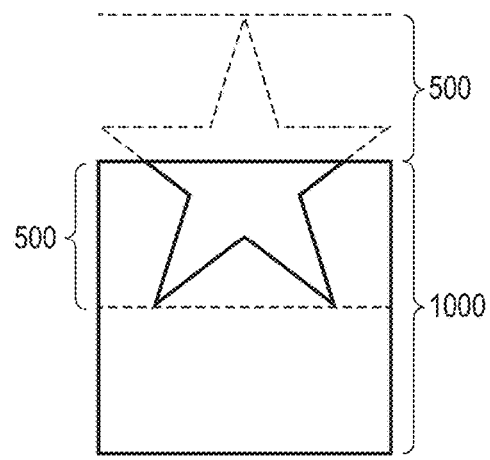
SVG CONTENT OBTAINED BY SHIFTING
BY 500 IN VERTICAL DIRECTION
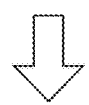
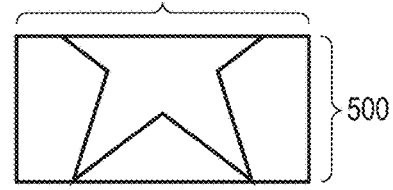
SVG DISPLAY SCREEN

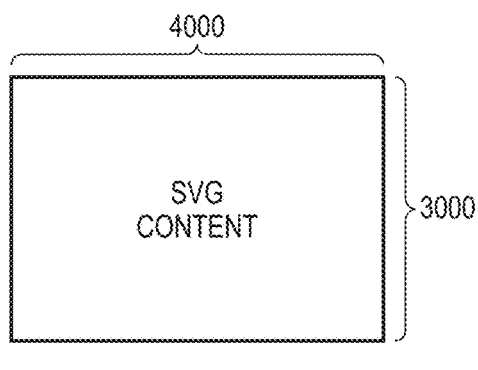
F I G. 13A
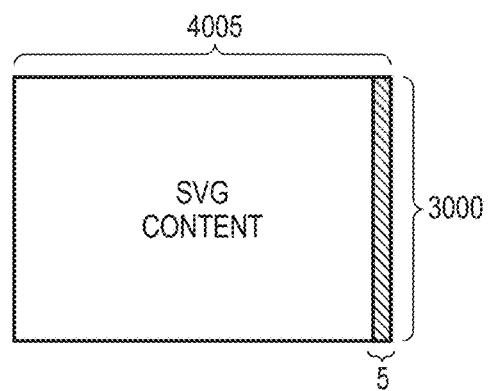
F I G. 13B

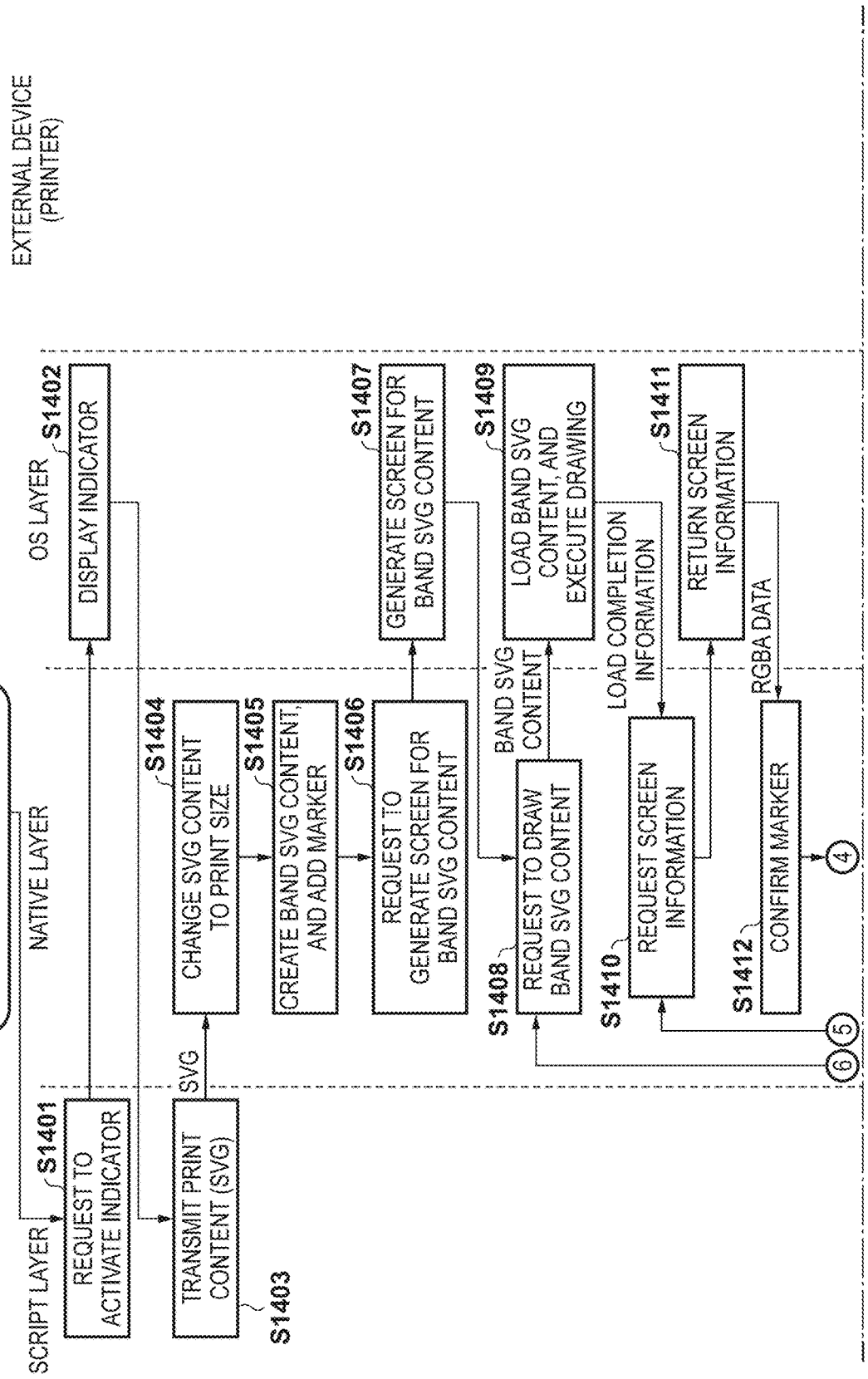

INFORMATION PROCESSING APPARATUS THAT EXECUTES PRINTING BASED ON WHETHER DRAWN DATA INCLUDES DATA FOR A PREDETERMINED ELEMENT, INFORMATION PROCESSING METHOD, AND NON-TRANSITORY COMPUTER-READABLE STORAGE MEDIUM STORING PROGRAM

BACKGROUND OF THE INVENTION

Field of the Invention

The present invention relates to an information processing apparatus capable of executing rendering, an information processing method, and a non-transitory computer-readable storage medium storing a program.

Description of the Related Art

In recent years, portable multifunction terminals (to be referred to as mobile computers hereinafter) having a camera function have become widespread. Such mobile computer is basically formed from three elements, that is, hardware as the computer itself, an operating system (to be referred to as an OS hereinafter) operating on the hardware, and an application operating on the OS. By using the application, the user can use a function such as a map, mail, or browsing of a Web site on the Internet.

There exist mainly two forms of applications operating on such mobile computer, that is, native applications and Web applications. The features of each application form will be explained below.

A native application is normally developed using a development environment and a development language prepared on an OS basis. For example, the C/C++ language is used on an OS provided by company A, the Java® language is used on an OS provided by company B, and a different development language is used on an OS provided by company C. In general, the native application is compiled in advance in each development environment, and converted from a so-called high-level language understandable by a human into instruction sets such as an assembler language interpretable by the CPU of the computer. Thus, the general native application has a feature that it is possible to perform an operation at high speed since the CPU directly interprets instructions.

The Web application is an application operating on a Web browser which is normally embedded in an OS on each computer. The Web application is generally developed using a language such as HTML5, CSS, or JavaScript® so that the Web browser can interpret the application. These languages are Web standard languages. Therefore, once a Web application is described using the Web standard language, it can operate in any environment where the Web browser operates.

The form of a hybrid application holding both the advantage of the native application and that of the Web application has recently received attention. All or most of the user interfaces (UIs) of the hybrid application are described in the Web standard language such as HTML5, CSS3, or JavaScript. In addition, a function described in a native language can be used from contents described in the Web standard language. That is, both a script layer and a native layer by the Web standard language are included in one application. This can form a software arrangement which holds both the advantage of the native application and that of the Web application.

To print a print content, it is necessary to generally convert data into high-resolution image data (so-called bitmap data) required by the print engine of a printer. This processing is called rendering processing.

Japanese Patent Laid-Open No. 2013-137622 describes a technique in which an OS generates print data from print target data stored in a clipboard as a memory area for temporarily storing data.

In the hybrid application, drawing of a print content is also described using the Web standard language. For example, the above-described print content is generated in, for example, SVG (Scalable Vector Graphics) of HTML5. SVG is a description method for displaying graphics, which is usable by the Web standard language.

To convert the print content into bitmap data, the hybrid application generates SVG data on an offscreen screen. As in, for example, Japanese Patent Laid-Open No. 2013-137622, the OS generates print data to be printed.

However, in this arrangement, an error may occur in capturing (acquisition of image data). Upon completion of loading of SVG data, each OS issues a load completion notification unique to the OS. If, however, the load completion notification provided by the OS is a notification of completion of loading of the SVG data, this timing is different from that at which drawing of the contents of the SVG data is completed. Therefore, at the timing of the notification or the timing immediately after the notification, the OS may not complete drawing of the SVG data loaded by the load operation corresponding to the notification. In this case, in a memory area in which the data drawn by the OS is written, data different from that to be captured in response to the notification is stored. Thus, if capturing is performed at this timing, data different from that to be originally captured is unwantedly captured as an output target.

SUMMARY OF THE INVENTION

An aspect of the present invention is to eliminate the above-mentioned problems with the conventional technology. The present invention provides an information processing apparatus which can appropriately determine, in an arrangement in which a hybrid application acquires drawing data in response to a notification, even if the notification is made regardless of completion of drawing, whether the data is set as a print target, an information processing method, and a non-transitory computer-readable storage medium storing a program.

The present invention in one aspect provides an information processing method performed by executing, by at least one processor, an application program stored in a memory, comprising: instructing a drawing unit to draw a print target content and a predetermined element; acquiring drawn data from the drawing unit based on a notification from the drawing unit, which corresponds to the instructing and has been made regardless of completion of the drawing to the instructing; causing, if the acquired data includes data corresponding to the predetermined element, a print apparatus to execute printing based on the acquired data; and acquiring, if the acquired data includes no data corresponding to the predetermined element, data from the drawing unit again without causing the print apparatus to execute printing based on the acquired data.

According to the present invention, in an arrangement in which a hybrid application acquires drawing data in response to a notification, even if the notification is made regardless of completion of drawing, it is possible to appropriately determine whether the data is set as a print target.

Further features of the present invention will become apparent from the following description of exemplary embodiments with reference to the attached drawings.

BRIEF DESCRIPTION OF THE DRAWINGS

FIGS. 8A and 8B are flowcharts illustrating rendering and print processing;

FIGS. 11A and 11B are views each showing divided block images;

FIGS. 12A and 12B are views each showing a case in which a divided image is acquired on a band basis;

FIGS. 13A and 13B are views showing a case in which a marker is added;

FIGS. 14A and 14B are flowcharts illustrating rendering and print processing;

DESCRIPTION OF THE EMBODIMENTS

Figure 1:
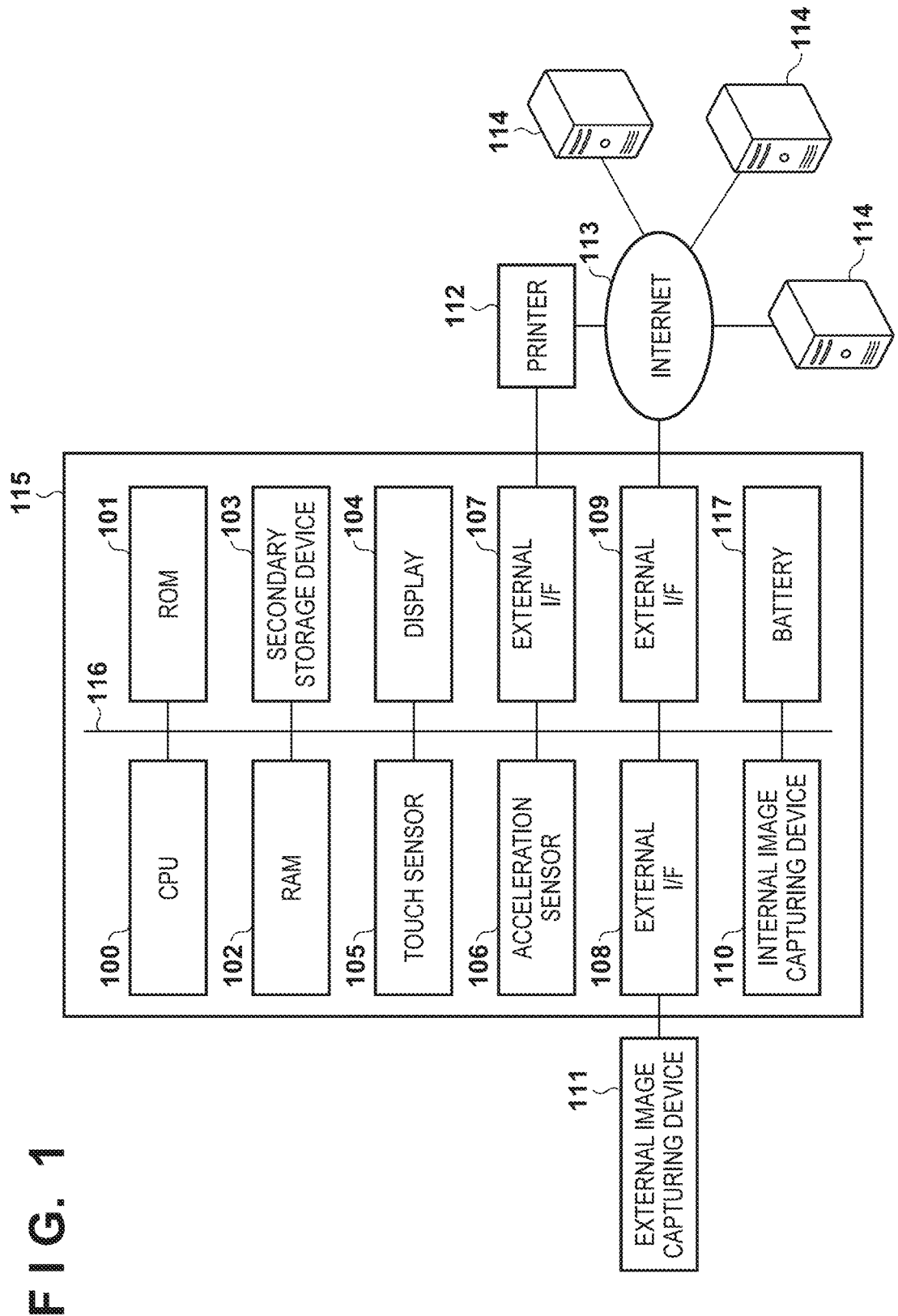
FIG. 1 is a block diagram showing the hardware arrangement of an information processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

In this embodiment, a photo print application in a hybrid application will be described. For example, on the UI of the photo print application, a photo to be printed is drawn, a stamp such as a pictorial symbol is superimposed on it, and the user causes a printer to print the result. In the case of the hybrid application, drawing of such print content is described using the Web standard language. If a print content, as described above, is generated in, for example, SVG, a photo is selected first, and a text or a stamp is superimposed on it.

An example of SVG data after executing "photo addition" or "stamp addition" is as follows.

```
<svg width="width of print content"
height="height of print content">
        <image xlink:href="designation of image
file"
width="width of photo"
height="height of photo"
x="x-coordinate of photo"
y="y-coordinate of photo"/>
        <image xlink:href="designation of stamp
file"
width="width of photo"
height="height of photo"
        x="x-coordinate of stamp"
        y="y-coordinate of stamp"/>
</svg>
```

As described above, the SVG data is a character string in which graphic drawing commands are listed, and is displayed on the UI when interpreted by an interpreter. To print the above print content, the print content generally needs to be converted into high-resolution image data (so-called bitmap data) required by the print engine of the printer.

However, if a load completion notification provided by the OS is a notification of completion of loading of the SVG data, data different from that to be originally captured may be unwantedly captured.

To solve this problem, a method of using a timer function and performing capturing after a predetermined time elapses may be adopted. However, the timing at which drawing is completed varies depending on the device performance. Therefore, if the timer function is used, a sufficiently long time needs to be set, thereby significantly impairing the usability. Since the uncertainty of capturing is not solved by only standing by using the timer function, the above problem is not essentially solved.

This embodiment will describe, in detail below, a technique of deciding, if the hybrid application receives the load completion notification of SVG data from the OS, whether drawn data is set as an output target (for example, a print target), by determining whether the data includes a predetermined element.

First Embodiment

A procedure of printing a print content after operating a hybrid photo print application (to be described later) according to this embodiment on a portable information terminal and applying various kinds of image processing to an image selected by the user will be explained below.

[Hardware Arrangement]

FIG. 1 is a block diagram showing an example of the arrangement of a portable information terminal such as a smartphone or portable telephone as an information processing apparatus 115 according to this embodiment. Referring to FIG. 1, a CPU 100 (Central Processing Unit/Processor) comprehensively controls the information processing apparatus 115, and executes various kinds of processing (to be described below) according to a program. There is one CPU 100 in FIG. 1 but a plurality of CPUs or CPU cores may be included. A ROM 101 is a general-purpose ROM, and stores, for example, a program to be executed by the CPU 100. A RAM 102 is a general-purpose RAM, and is, for example, a memory for temporarily storing various kinds of information at the time of executing the program by the CPU 100. A secondary storage device 103 such as a hard disk or flash memory is a storage medium for storing various programs and data such as files and databases which hold the processing results of image analysis and the like. A display 104 displays a UI (User Interface) for accepting user operations for implementing various kinds of processing, and various kinds of information such as the result of executed processing. A touch sensor 105 detects a touch operation on a touch panel displayed on the display 104.

Image data captured by an internal image capturing device 110 undergoes predetermined image processing, and is then saved in the secondary storage device 103. Image data may be loaded from an external image capturing device 111 connected via an external I/F (interface) 108. The information processing apparatus 115 includes an external I/F (interface) 109, and communicates with the outside via a network 113 such as the Internet. The information processing apparatus 115 acquires, via the external I/F 109, image data from servers 114 connected to the network 113. The information processing apparatus 115 includes an acceleration sensor 106, and acquires acceleration information about the position and orientation of the information processing apparatus 115. The information processing apparatus 115 is connected to a printer 112 via an external I/F 107, and outputs image data and the like. The printer 112 is also connected to the network 113, and transmits/receives, via the external I/F 109, data necessary for print processing.

Each of the external I/Fs 107, 108, and 109 is an interface having at least one of a wired communication mode and wireless communication mode, and communicates with an external device (the printer 112 or server 114) in accordance with the communication mode used. For wired communication, for example, USB, Ethernet®, or the like is used. For wireless communication, a wireless LAN, NFC (Near Field Communication), Bluetooth®, infrared communication, or the like is used. If a wireless LAN is used for wireless communication, there are a mode in which apparatuses are directly connected to each other and a mode in which apparatuses are connected to each other via a relay apparatus such as a wireless LAN router. Although the external I/Fs 107, 108, and 109 are arranged separately in FIG. 1, they may be integrally arranged. A battery 117 supplies power necessary for the operation of the information processing apparatus 115. The various components of the information processing apparatus 115 are interconnected via a control bus/data bus 116, and the CPU 100 controls the various components via the control bus/data bus 116.

Note that in this embodiment, the information processing apparatus 115 serves as, for example, the execution environment of software such as a program executed by the CPU 100 mounted on a controller board.

[Software Arrangement]

Figure 2:
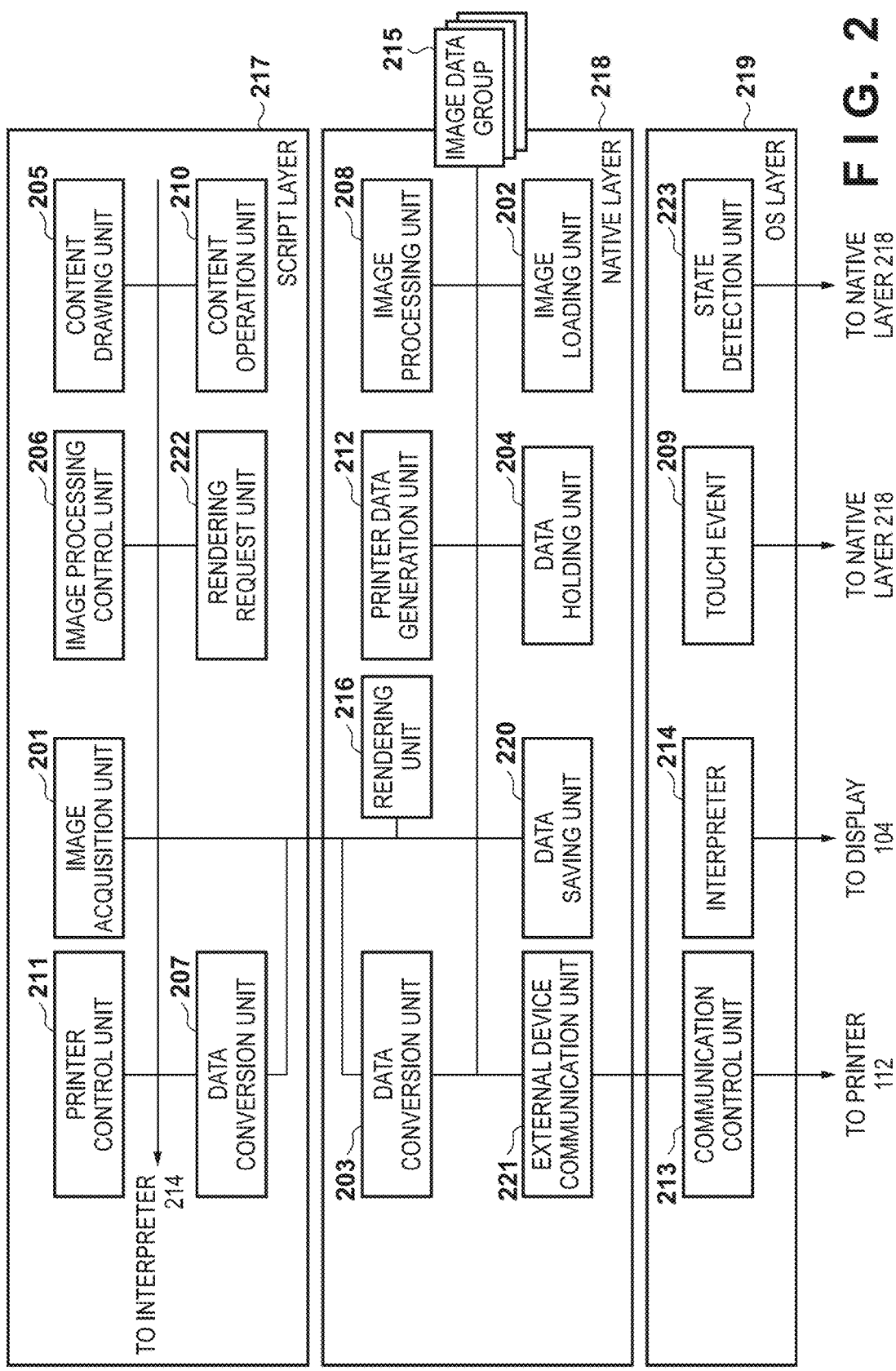
FIG. 2 is a block diagram showing the software arrangement of the information processing apparatus.

FIG. 2 is a block diagram showing the arrangement of software operating on the information processing apparatus 115. The information processing apparatus 115 executes a program including a script layer 217, a native layer 218 lower than the script layer 217, and an OS layer 219 lower than the native layer 218. The arrangement of each layer is implemented when the CPU 100 reads out and executes the program stored in the ROM 101 or secondary storage device 103.

The script layer 217 is a program layer in which script instruction sets (instruction sets such as drawing of a content, display of an image, and playback of a moving image) are described by text data using the Web standard language such as HTML5, CSS3, or JavaScript. In the script layer 217, in an application execution environment, a processor, for example, the CPU 100 existing in the application performing environment translates and executes various instruction sets of text data. For example, as execution forms, there may be a form in which statements are dynamically translated line by line every execution operation, a form in which statements are translated when activating an application, and a form in which statements are translated when installing an application in the information processing apparatus 115. Processing in the script layer 217 and its contents will be referred to as a "script" hereinafter. As an example of a form in which the instructions of the script are translated in the information processing apparatus 115, the interpreter function of the native layer 218 or OS layer 219 is used. Note that in this embodiment, most of the UIs of the application are assumed to be described in the script layer 217.

The native layer 218 is a program layer in which an instruction set translated (compiled) in advance in an environment other than the application execution environment is described. As for its form, codes described in a high-level language such as C or C++ are compiled in advance on the server or the PC of the developer of the application and form an aggregate of instructions interpretable by the CPU 100. Processing in the native layer 218 and its contents, and calling of the function of the OS layer 219 (to be described later) from the native layer 218 will be referred to as "native" hereinafter. Note that an example of another implementation system of the native layer 218 is Java. Java is a high-level language similar to C/C++, and is translated in advance into an intermediate code in the development environment at the time of development of the application. The translated intermediate code operates in the Java virtual environment of each OS. In this embodiment, such program form is also included in a kind of native layer 218.

The OS layer 219 corresponds to the operating system (OS) of the information processing apparatus 115. The OS layer 219 has a unique function and a role of providing the hardware function to the application. The OS layer 219 includes an API. The function of the OS layer 219 can be used from the script layer 217 and native layer 218.

In this embodiment, allowing calling of the native layer 218 from the script layer 217 will be referred to as "binding" or "bind". Various kinds of functions of the native can be used by providing an API and calling the API by the script. In general, this binding function is normally included in each of various OSs. Note that in this embodiment, the application which includes the script layer 217 and native layer 218 to form a layered structure and execute a predetermined function in cooperation with each other will be referred to as a hybrid application hereinafter.

The arrangement of the software has been explained above. Each block will be described below.

An image acquisition unit 201 of the script layer 217 requests the native layer 218 to acquire image data. As the request of the image acquisition unit 201, for example, a method of designating the path of image data or a method of prompting for dialog display is used.

An image loading unit 202 of the native layer 218 acquires (loads) the image data from an image data group 215. A method of acquiring the image data from the image data group 215 depends on the request of the image acquisition unit 201 of the script layer 217. As the request method, for example, there are a method of selecting image data from a dialog box provided on the UI and a method of directly designating image data by its path. At the time of image loading, a unique ID is assigned to the image data. When image data in the native layer 218 is designated from the script layer 217, the above ID is used.

A data conversion unit 203 of the native layer 218 converts data in the native layer 218, for example, image data or a parameter in a binary format into data in a format processable in the script layer 217, for example, image data in a text format (BASE64) or JSON format. JSON (JavaScript Object Notation) is a data format usable in JavaScript. On the other hand, the data conversion unit 203 converts data sent from the script layer 217, for example, image data in a text format (BASE64) or JSON format into data in a format processable in the native layer 218, for example, image data or a parameter in a binary format.

A data conversion unit 207 of the script layer 217 converts data in the script layer 217, for example, a processing parameter in a text format into data in a format processable in the native layer 218, for example, image data or a parameter in a binary format. On the other hand, the data conversion unit 207 converts data sent from the native layer 218, for example, image data or a parameter in a binary format into data in a format processable in the script layer 217, for example, a processing parameter in a text format.

A data holding unit 204 of the native layer 218 holds the image data loaded by the image loading unit 202, image data having undergone image processing by an image processing unit 208, and a divided image group. The held image data is rasterized into, for example, RGB image data, and has a format which enables execution of image processing immediately.

A content drawing unit 205 of the script layer 217 describes a content (print content) for printing using the Web standard language. Contents operated by a content operation unit 210 are reflected on the description. The script of the content described by the content drawing unit 205 is interpreted by an interpreter 214 of the OS layer 219 and displayed on the display 104.

An image processing control unit 206 of the script layer 217 decides a correction parameter to be used for image processing and image data to be processed, and requests the image processing unit 208 of the native layer 218 to perform image processing. The correction parameter is converted by the data conversion unit 207 into a format transmittable to the native layer 218, and then transmitted to the native layer 218 together with the ID of the image data to be processed.

The image processing unit 208 of the native layer 218 performs image processing for the image data designated by the image processing control unit 206. At this time, image processing to be executed is decided based on the parameter set by the image processing control unit 206. As for the designation of the image data, a method of using the above-described ID, a method of receiving the path of the image data from the script layer 217, or the like is used.

A touch event 209 of the OS layer 219 acquires information about a touch operation on the display 104. The information about a touch operation includes, for example, touch operation detection on the display 104 and touched position information. The acquired information about a touch operation is transmitted to the content operation unit 210 of the script layer 217 via the native layer 218.

For example, if the image data is returned from the native layer 218 as a result of the image acquisition request, the content operation unit 210 of the script layer 217 changes the script instruction to reflect operation contents on the image data.

A printer control unit 211 of the script layer 217, for example, requests printer detection, displays a printer setting screen, and generates and transmits print information. In the printer setting screen (to be described later), printer settings such as a paper size, paper type, and color/monochrome are made. Based on the items set here, a printer data generation unit 212 generates printer data.

Based on the request from the printer control unit 211, the printer data generation unit 212 of the native layer 218 generates a command and data necessary for printer communication. The data necessary for printer communication is data complying with a communication protocol with the printer 112, and the command is data for deciding the operation of the printer such as printing or scanning. That is, the printer data generation unit 212 generates printer data including a command for deciding the operation of the printer.

An external device communication unit 221 of the native layer 218 is an interface (I/F) for communication with an external device such as the printer 112 connected to the information processing apparatus 115. The external device communication unit 221 transmits data received from the printer data generation unit 212, or receives information from the printer 112. In this embodiment, communication is done via a communication control unit 213 of the OS layer 219. However, the external device communication unit 221 may directly transmit data to the external I/F 107. If the communication control unit 213 of the OS layer 219 supports the communication protocol used by the external device, its function is used to perform communication. On the other hand, if the communication control unit 213 does not support the communication protocol used by the external device, the external device communication unit 221 performs communication in accordance with the communication protocol.

The interpreter 214 of the OS layer 219 interprets/executes an instruction described in the Web standard language and generated in the script layer 217. For example, an instruction such as an image drawing instruction is executed via the interpreter 214 and displayed on the display 104.

The image data group 215 is an area which holds image data. A data saving unit 220 saves image data held in the data holding unit 204 in the image data group 215, as needed.

A rendering request unit 222 of the script layer 217 requests a rendering unit 216 of the native layer 218 to perform rendering. At this time, contents described by the content drawing unit 205 are converted by the data conversion unit 207 and then transferred to the rendering unit 216. If processing is needed before the transfer to the rendering unit 216, the content description may be edited using the content operation unit 210. If direct editing of the content description influences the UI, a copy of the content description is created and undergoes an editing operation.

The rendering unit 216 performs rendering to generate, from the contents received from the rendering request unit 222, image data to be transmitted to the printer 112. The rendering includes, for example, generation of an image having an output resolution to the printer 112 in the script layer 217. If an offscreen screen is generated, neither the rendering result in the native layer 218 nor the image currently generated is displayed on the display 104.

A state detection unit 223 of the OS layer 219 detects a change in state of a device or execution status of an application. For example, if there is another notification such as an incoming call in a state in which the application is executed, generation of the event or the state change is transmitted to the native layer 218.

[Photo Image Print Processing]

Figure 3:
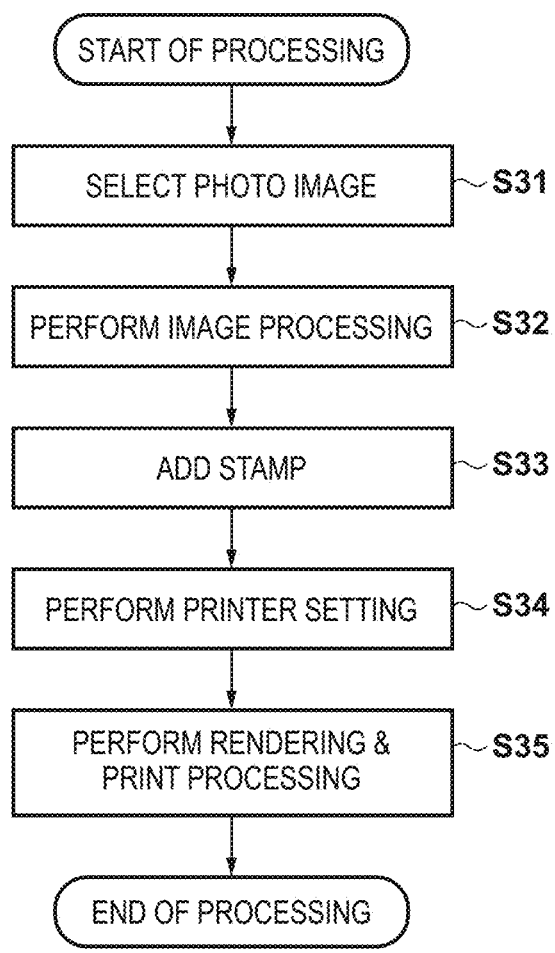
FIG. 3 is a flowchart illustrating photo image print processing.

FIG. 3 is a flowchart illustrating photo image print processing. An overview of each of processes in steps S31 to S35 will be explained with reference to FIG. 3 and details thereof will be described later. Note that each process of the flowchart is implemented when the CPU 100 of the information processing apparatus 115 executes a program stored in the ROM 101 or secondary storage device 103. An application screen 900 is generated by the script layer 217. A user operation on the application screen 900 is accepted via, for example, the touch sensor 105.

In step S31, upon detecting a user operation (including a touch operation input, the same shall apply hereinafter) on a photo image selection button 901 of the application screen 900, the CPU 100 selects image data in accordance with the operation. After the image data is selected, the CPU 100 executes specific processing in the native layer 218, and then displays an image of the selected image data in a drawing region 906 of the application screen 900.

In step S32, upon detecting a user operation on a slide bar 902 for adjusting the luminance of the displayed image, the CPU 100 sets a correction parameter to be used for image processing in accordance with the user operation. In response to an execution start instruction operation, the CPU 100 executes the image processing for the image data in accordance with the set correction parameter, and performs specific processing, thereby displaying processing contents and a processing result in the drawing region 906.

In step S33, upon detecting a user operation on a stamp addition button 903, the CPU 100 displays a stamp list. Upon detecting selection of a stamp by a user operation on the stamp list, the CPU 100 adds/displays the selected stamp in the drawing region 906. Furthermore, by adding a touch event (tap or swipe) detection function to the stamp, enlargement/reduction or movement of the stamp may be performed. This detection function is included in the Web standard language as a standard function. For example, an addEventListener function corresponds to the function. An example of a description indicating an operation when the stamp is touched is as follows.

```
var stamp = target stamp;
stamp.addEventListener("touchstart", function(e){
    //processing to be performed when stamp is
touched is described here
}, false);
```

Figure 10:
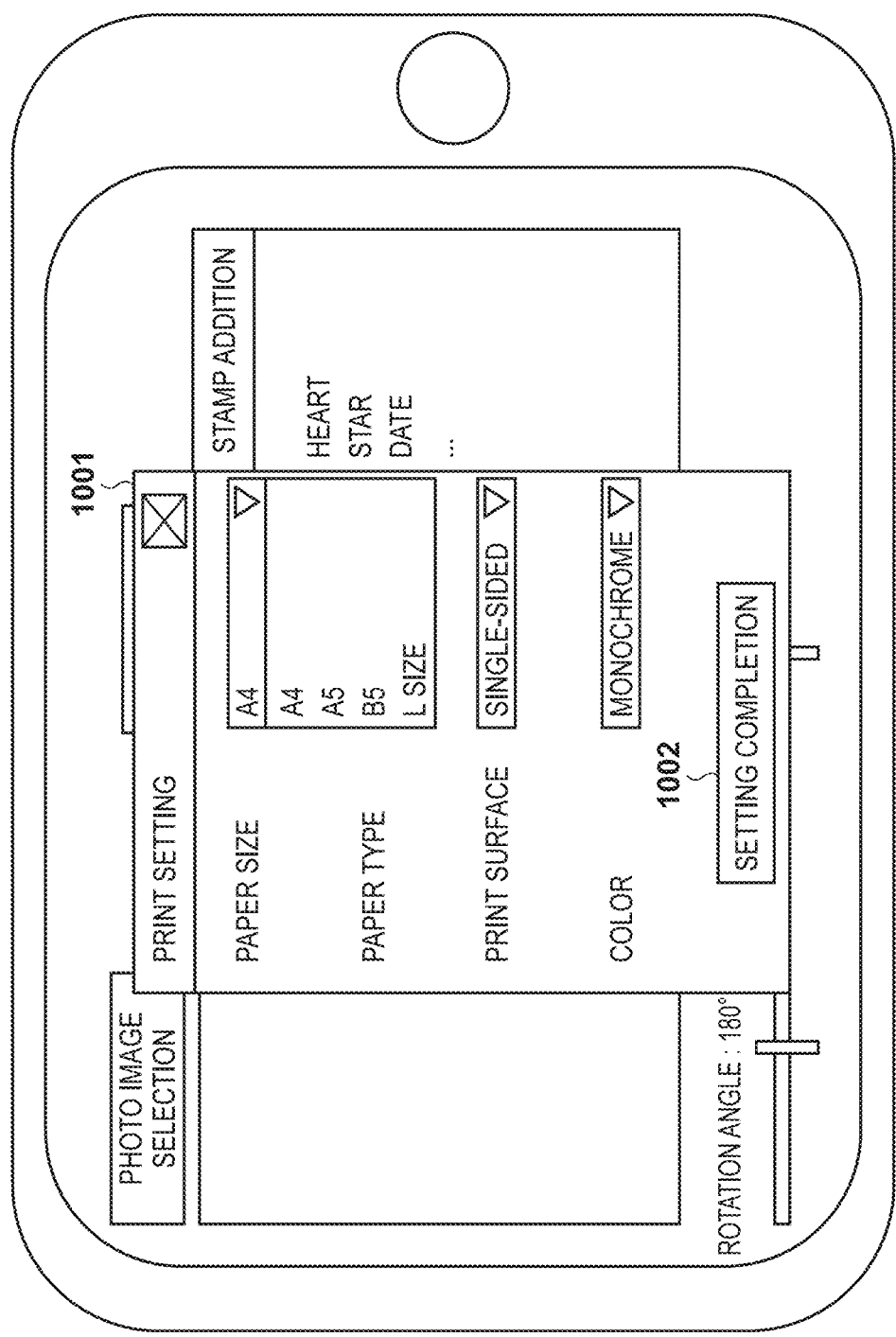
FIG. 10 is a view showing a print setting screen.

In step S34, upon detecting a user operation on a print button 905, the CPU 100 displays a setting screen 1001 of FIG. 10 for setting information necessary for printing. The information necessary for printing includes, for example, setting items of a paper size, paper type, print quality, and bordered/borderless, as shown in the setting screen 1001 of FIG. 10. In addition, settable setting items such as double-sided/single-sided and monochrome/color are displayed depending on the functions of the printer to be used.

In step S35, upon detecting a user operation on a setting completion button 1002 of the setting screen 1001, the CPU 100 executes rendering to convert the image displayed in the drawing region 906 into data to be output to the printer 112.

After creating the printer data by rendering, the CPU 100 transmits the printer data together with a printer control command to the printer 112. With the above processing, the image selected by the user is printed by the printer 112.

Note that the processing shown in FIG. 3 is merely an example. Processing contents are not limited to this, and the processing order of the processes of FIG. 3 is not limited to this either. In this embodiment, the first program layer (first layer) including an instruction set to be translated and executed by the processor is defined as the script layer 217, and the second program layer (second layer) including an instruction set translated in advance by a unit other than the processor is defined as the native layer 218. A program having the layered structure of the first program layer and the second program layer implements a hybrid application.

[Photo Image Selection]

Photo image selection and associated image processing, which are executed by the information processing apparatus 115 with the above arrangement, will be described next. When executing these processes, the information processing apparatus 115 functions as an image processing apparatus.

Figure 9:
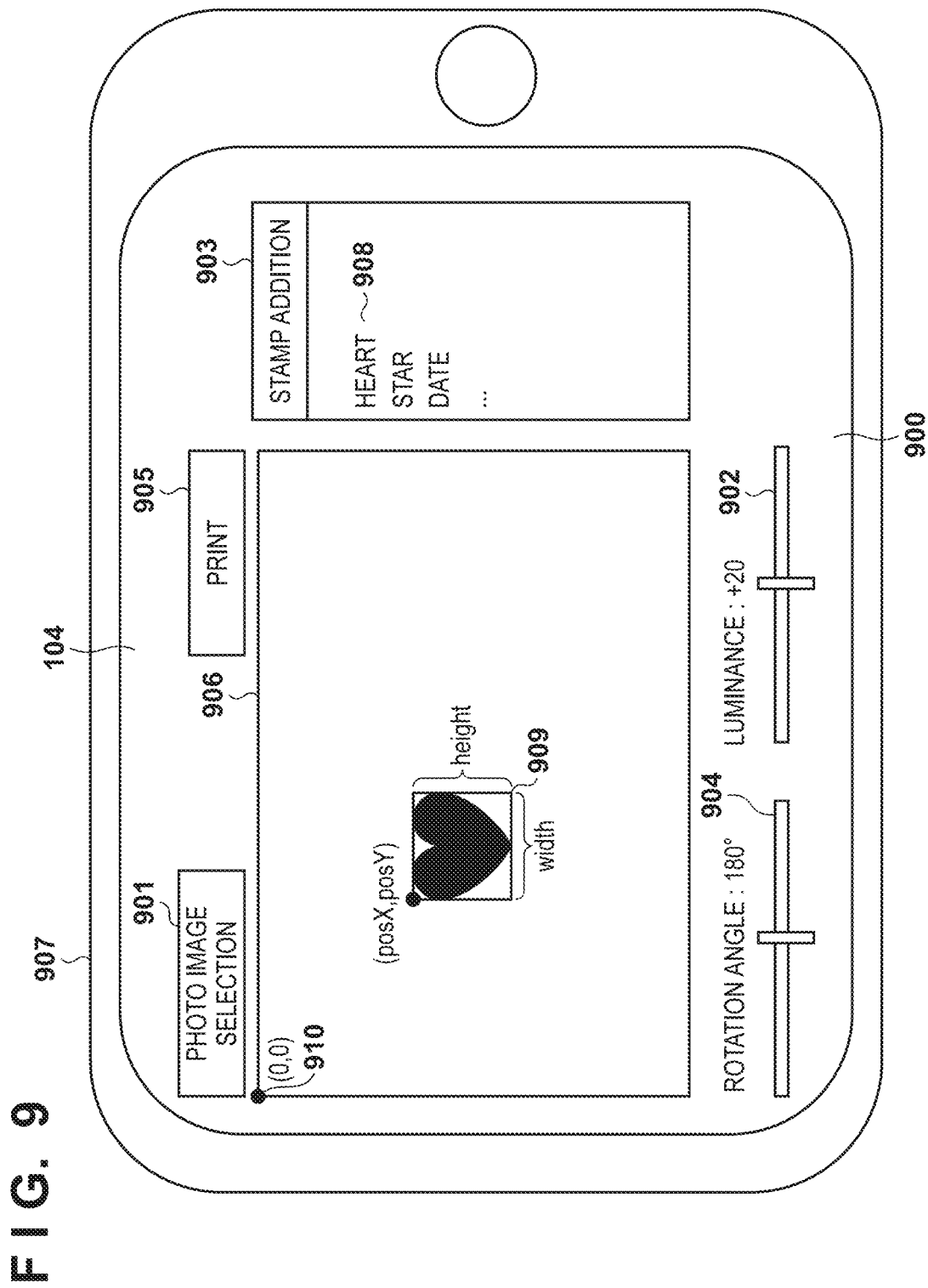
FIG. 9 is a view showing an application screen.

When detecting a user operation on the photo image selection button 901 of FIG. 9, step S31 starts. Details of the photo image selection in step S31 of FIG. 3 will be described with reference to FIG. 4. Note that steps S401 and S411 are processes executed by the CPU 100 using the program of the script layer 217, and steps S402 to S410 are processes executed by the CPU 100 using the program of the native layer 218.

In step S401, in the script layer 217, the CPU 100 requests the native layer 218 to select an image in accordance with a user operation on the photo image selection button 901. In this request, an image selection API unique to the native layer 218 is directly called from the script layer 217 by the binding function. Note that if the image selection API unique to the native layer 218 cannot directly be called, a function capable of being directly called from the script layer 217 may be prepared in the native layer 218, and a function of calling the image selection API unique to the native layer 218 may be described in the function. This is a method of preparing a wrapper in advance. Alternatively, an arrangement which independently implements an image selection UI may be used.

In step S402, in the native layer 218, the CPU 100 displays the image selection UI on the display 104. The CPU 100 selects one arbitrary image based on a user operation on the displayed image selection UI. Note that in this embodiment, one image is selected from an image folder in the device. However, the present invention is not limited to this. For example, an image on the Internet or an image in a detachable storage medium may be selected. Alternatively, an image may be shot using the camera function of the device and selected.

In step S403, in the native layer 218, the CPU 100 generates a unique ID. This ID can have any format such as a numerical value or a character string as long as it can be transmitted from the native layer 218 to the script layer 217. Note that the ID need not always be generated in the native layer 218 and may be generated in the script layer 217 and sent to the native layer 218.

In step S404, in the native layer 218, the CPU 100 acquires the selected image. For example, if the selected image is in the state of an image file, the CPU 100 opens the file, and acquires the contents by reading them.

In step S405, in the native layer 218, the CPU 100 rasterizes the acquired image in an RGB space. In this example, RGB data are held in the native layer 218. However, the present invention is not limited to this. For example, the data may be held in the JPEG (Joint Photography Expert Group), PNG (Portable Network Graphics), or RGBA format. The RGBA format combines A which is a degree of transparency with the RGB (red, green, and blue) components of image data.

In step S406, in the native layer 218, the CPU 100 divides the rasterized RGB data to create RGB data of each small region. The RGB data of each small region will be referred to as a "block image" hereinafter. A block image can have either a tile shape or a strip (band) shape. The tile shape represents that both the width and height of a block image are smaller than those of the division source data, as shown in FIG. 11A. The strip shape represents that only one of the width and height of a block image is smaller than that of the division source data, as shown in FIG. 11B.

In this embodiment, assume that a method of dividing the original image data into two strip-shaped block images is adopted. A method of designating a specific number as a division number, a method of dividing the image data such that the number of pixels of one block image becomes smaller than a specific number, or the like is used. The sizes of the block images need not be equal to each other. For example, when dividing an image of 3,000 px (pixels)×2,000 px into two block images, a block image of 3,000 px×1,500 px and a block image of 3,000 px×500 px may be obtained.

In step S407, in the native layer 218, the CPU 100 holds the rasterized RGB data and the generated block image group in the data holding unit 204 in association with the ID generated in step S403. As an associating method, for example, a method of creating an object including the ID, the RGB data, and the block image group to make it possible to specify the RGB data and the block image group by the ID is used. The ID associating method is not limited to this, and any method is usable as long as the RGB image and the block image group can be specified by the ID.

The RGB data and the block image group may be held on a memory or saved as a file. In this embodiment, assume that the block image group is converted into a DIB (Device Independent Bitmap) format processable by the script layer 217 and saved in a file. In this case, association with the ID can be implemented by adding the ID to decided names like "block1_ID.bmp" and "block2_ID.bmp". As an image format, a format other than the DIB format may be used.

In step S408, in the native layer 218, the CPU 100 creates, from the RGB data, reduced RGB data to be used in the UI. The RGB data may be reduced using the function of the OS or by a unique implementation. If the returned image is large, the script performs reduction processing of the image based on the size of the UI and the resolution of the display 104. If the script handles an image of an excessive number of pixels relative to the UI, a processing load is applied to the CPU 100, and a large memory capacity is needed. In this embodiment, since reduction processing is executed, it is possible to avoid the memory capacity from becoming large. As the guideline of the reduction processing, for example, the display size of the display 104 or the size of a portion to display an image in the UI is set as the upper limit, and control is executed to perform the reduction processing for an image whose number of pixels exceeds the upper limit. When executing image processing for the image, image processing is executed for the original image (image data rasterized to RGB data). After execution of the reduction processing described above, the reduced image is transferred to the script layer 217.

In step S409, in the native layer 218, the CPU 100 converts the reduced RGB data created in step S408 into image data in a format processable (supportable) in the script layer 217. In this embodiment, the converted data format is the JPEG (Joint Photography Expert Group) format.

In step S410, in the native layer 218, the CPU 100 converts the data in the JPEG format into BASE64 data, and transmits it to the script layer 217. This is because the format of the JPEG data handled in the native layer 218 cannot directly be processed in the script layer 217. BASE64 is an encoding method used to handle binary data as character string data, and is a data format processable in JavaScript®. As the method of handling an image in the script layer 217, a method of temporarily saving JPEG data in a file in the native layer 218 and using the saving path may be used. However, this embodiment assumes that a method of using BASE64 data is used.

In step S411, in the script layer 217, the CPU 100 receives the BASE64 data converted in the native layer 218 and draws an image in the drawing region. For example, the CPU 100 transmits the BASE64 data designated in the script layer 217 to the interpreter 214 of the OS layer 219. The interpreter 214 interprets the script of the BASE64 data and displays it as an image in the drawing region. An example of a sample code which reflects the BASE64 data on the drawing region is as follows.

```
var base64Data = BASE64 data from native layer;
var ID = unique ID generated in native layer;
//designate region of image to be reflected
var svg = "http://www.w3.org/2000/svg";
var xlink = "http://www.w3.org/1999/xlink";
var img = document.createElementNS(svg, "image");
    img.setAttributeNS(xlink, "href", base64Data);
    img.setAttribute("id", ID);
    img.setAttribute("width", 200);
    img.setAttribute("height", 200);
var target = document.getElementById("ID of SVG of
    addition destination");
    target.appendChild(img);
```

A method in which SVG data can be dynamically added to the drawing region 906 has been described above. A stamp (to be described later) can also be added to the drawing region 906 by the same operation.

[Image Processing]

Figure 5:
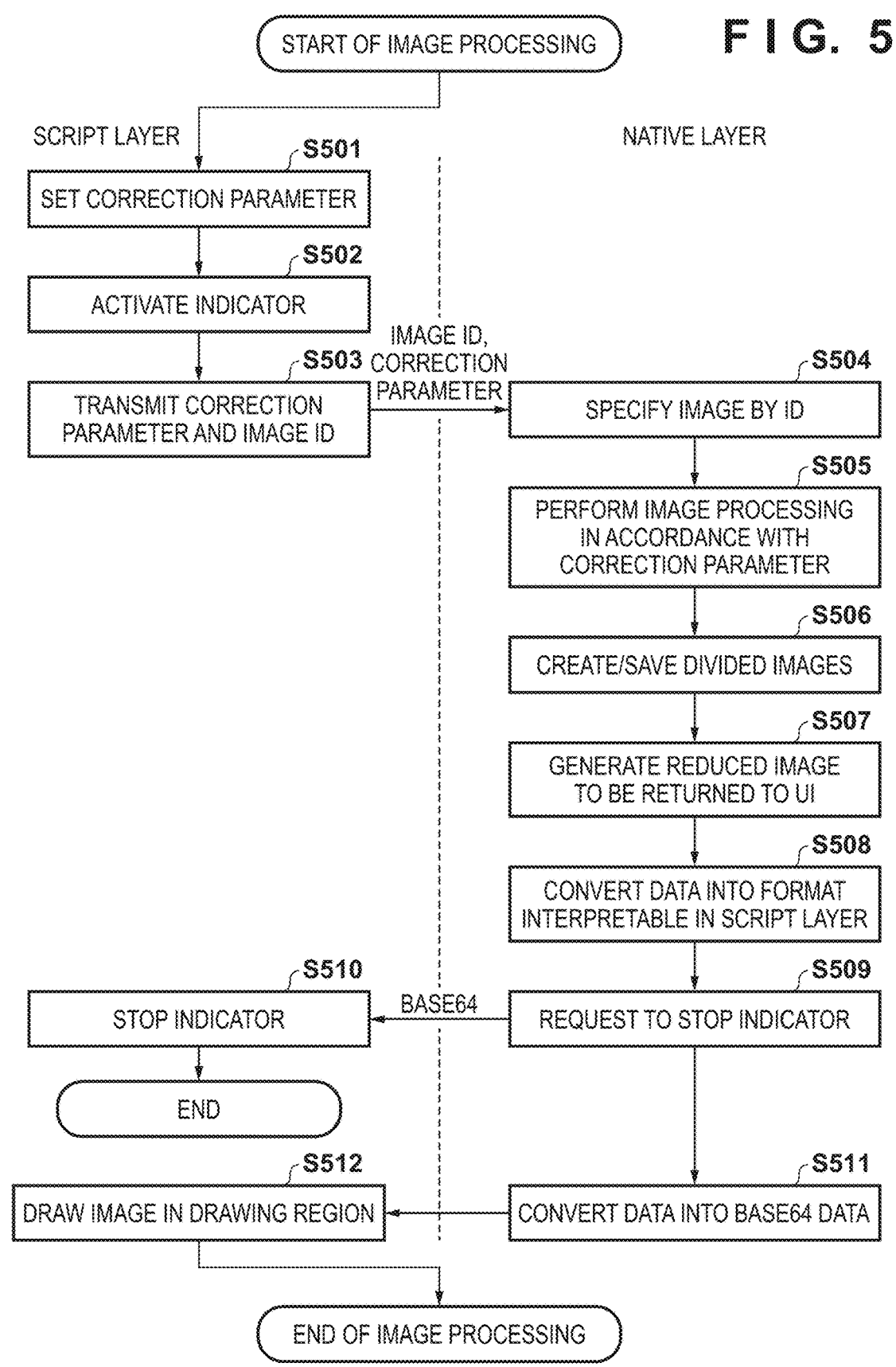
FIG. 5 is a flowchart illustrating image processing.

When an operation of changing the slide bar 902 of FIG. 9 is performed, step S32 starts. Details of the image processing in step S32 of FIG. 3 will be described with reference to FIG. 5. Note that steps S501 to S503, S510, and S512 are processes executed by the CPU 100 using the program of the script layer 217, and steps S504 to S507 and S509 are processes executed by the CPU 100 using the program of the native layer 218. Assume here that image processing of changing the brightness of the image is executed, and the degree of change corresponds to the set value of the slide bar 902 operated by the user.

In step S501, in the script layer 217, the CPU 100 sets a correction parameter. The correction parameter corresponds to the value of the slide bar 902. In step S502, in the script layer 217, the CPU 100 activates an indicator and displays it on the display 104. The indicator is a display to notify the user that processing is in progress, and a progress bar, a clock mark, rotation of a graphic, or the like is used. The indicator is used when processing which takes a long execution time is performed. In this embodiment, the script layer 217 activates and stops the indicator. However, the native layer 218 may activate and stop the indicator.

In step S503, in the script layer 217, the CPU 100 transmits, to the native layer 218, in the JSON format, the correction parameter set in step S501 and the ID (the ID of the image generated in step S403) of the image to execute image processing. JSON (JavaScript Object Notation) is a data description method usable in JavaScript, and is one of data formats transmittable/receivable to/from the native layer 218. For example, an example of a description for transmitting an ID and a value of luminance correction is as follows.

```
var json = {
    ID : image ID of image processing target,
    Brightness : 20
};
```

Figure 4:
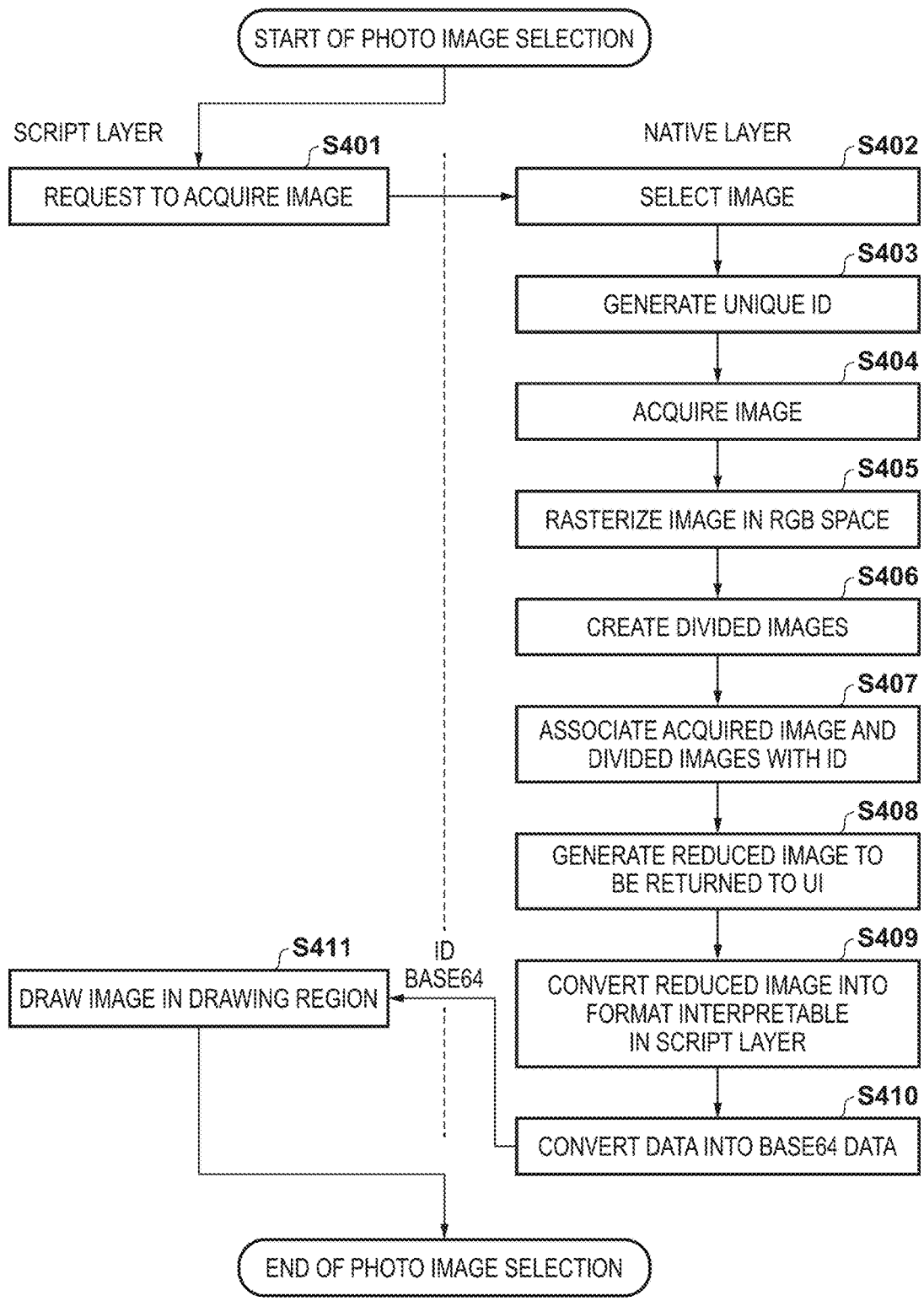
FIG. 4 is a flowchart illustrating photo image selection processing.

In step S504, in the native layer 218, the CPU 100 specifies the RGB data rasterized in step S405 of FIG. 4 based on the ID acquired from the script layer 217.

In step S505, in the native layer 218, the CPU 100 executes brightness correction for the RGB data based on the acquired correction parameter. In this embodiment, based on a value "20" set on the slide bar 902, processing of adding 20 to the RGB values of all pixels is performed. As for the image processing, image processing to be executed may be increased in number by adding another image processing information to the correction parameter. For example, monochrome conversion, sepia conversion, "ImageFix", "RedeyeFix", "SmartSkin", and the like may be added.

"ImageFix" is a function (face detection function) of automatically analyzing a photo image using personal face detection or a scene analysis unit and performing appropriate brightness/white balance adjustment. "RedeyeFix" is a function (red-eye detection function) of automatically detecting a red-eye image from an image and correcting it. "SmartSkin" is a function of detecting a personal face from a photo image and processing the skin region of the face. Note that the types of image processing functions are not limited to these, and various kinds of image processing are usable in accordance with the application purpose or aim. In addition, the image processing may be done using a function provided by the OS layer 219.

In step S506, in the native layer 218, the CPU 100 creates a block image group by the same processing as in step S406 from the RGB data which has undergone the image processing in step S505. In this example, the block image group associated with the ID in step S407 is replaced with the block image group created in step S506, and the block image group created in step S406 is discarded.

In step S507, in the native layer 218, the CPU 100 creates, from the RGB data which has undergone the image processing in step S505, reduced RGB data to be used in the UI. In step S508, in the native layer 218, the CPU 100 converts the reduced RGB data created in step S507 into data in a format supportable in the script layer 217. In this example, the reduced RGB data is converted into data in the JPEG format, as in step S409.

In step S509, in the native layer 218, the CPU 100 requests the script layer 217 to stop the indictor. This is implemented by calling an indicator stop function defined in the script layer 217 from the native layer 218.

In step S510, in the script layer 217, the CPU 100 stops the indicator, and erases the indicator from the display on the display 104. On the other hand, in step S511, in the native layer 218, the CPU 100 converts the converted data in the JPEG format into BASE64 data and transmits it to the script layer 217.

In step S512, in the script layer 217, the CPU 100 receives the BASE64 data converted in the native layer 218, and changes the contents drawn in step S411 in accordance with the received BASE64 data. For example, the CPU 100 transmits the BASE64 data designated in the script layer 217 to the interpreter 214 of the OS layer. The interpreter 214 interprets the script of the BASE64 data and displays the image data drawing result in the already existing drawing region. With the above processing, image data to which the image processing based on the correction parameter is applied is displayed.

In this embodiment, image processing is started by a change on the slide bar 902 as shown in FIG. 9. However, the starting method is not limited to this. For example, a plus button and a minus button may be laid out on the screen so that the brightness is adjusted every time the buttons are pressed. Alternatively, the brightness adjustment may be implemented by processing linked to a touch event so that, for example, the brightness is increased by a touch on the right half of the image and decreased by a touch on the left half. An arrangement may be adopted in which only the correction parameter is changed by a user operation and all image processes are performed at once when an image processing execution instruction is input.

[Stamp Addition]

Figure 6:
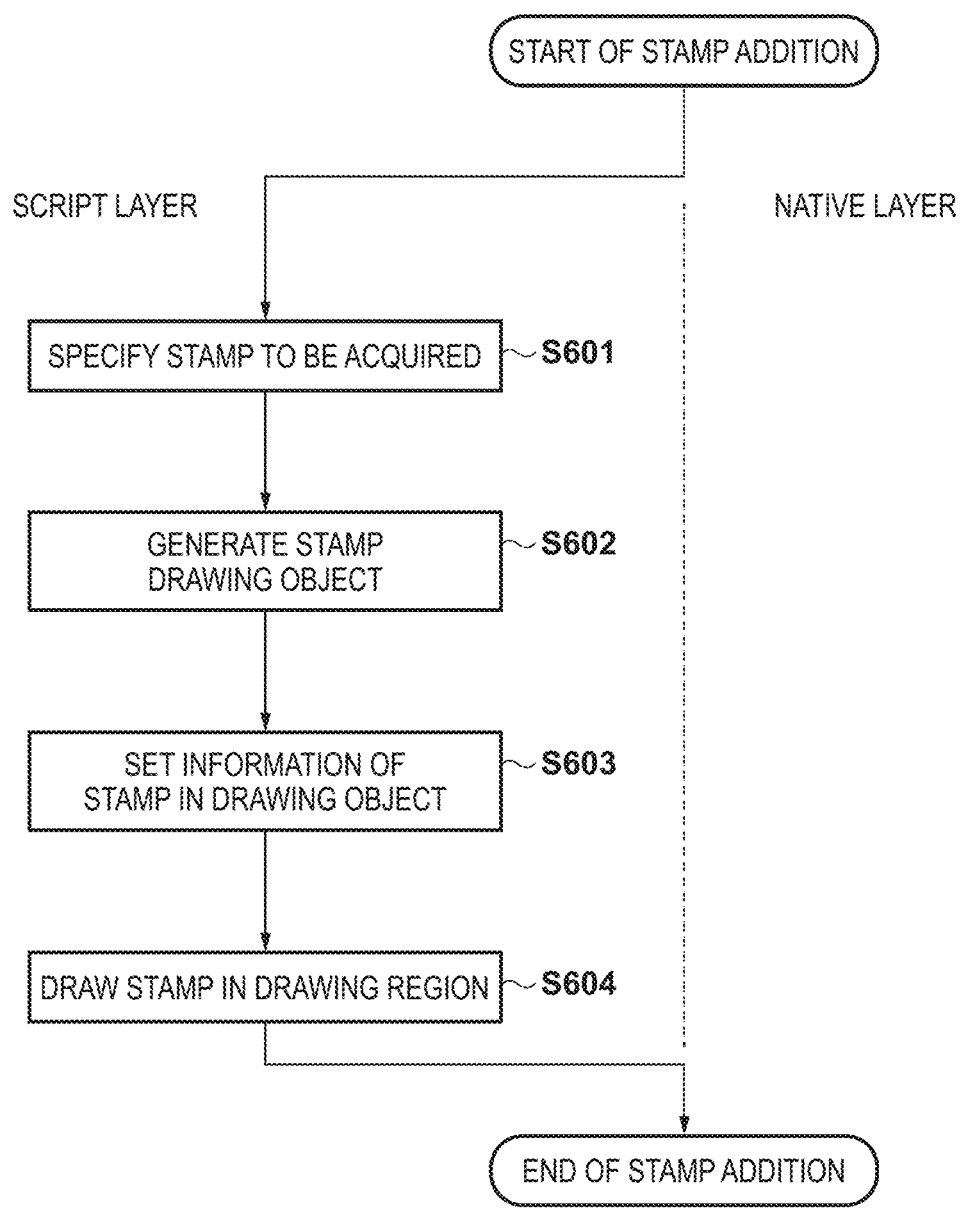
FIG. 6 is a flowchart illustrating stamp addition processing.

When the stamp addition button 903 of FIG. 9 is pressed and a heart stamp 908 is selected, the processing in step S33 starts. The stamp addition processing in step S33 of FIG. 3 will be described with reference to FIG. 6. In the following description, an example in which a stamp list is displayed by pressing the stamp addition button 903 on the application screen 900 of FIG. 9 by a user operation and, after that, the heart stamp 908 is selected will be exemplified. Note that the stamp addition processing is processing executed by the CPU 100 using the program of the script layer 217. Assume that the stamp to be used is held in advance as a resource file by the application.

In step S601, in the script layer 217, the CPU 100 acquires a path on which image data to be used as a stamp is saved. A stamp is acquired by processing of loading a predetermined file. Therefore, for example, when the heart stamp 908 is tapped, a path on which the heart stamp is saved is returned.

In step S602, in the script layer 217, the CPU 100 creates a stamp drawing object. In step S603, in the script layer 217, the CPU 100 sets the information of the path acquired in step S601 in the created stamp drawing object. The processes in steps S602 and S603 can be implemented by almost the same method as that used to add an image in step S411. Unlike step S411, the information source of the image is not BASE64 image data but the path of the stamp. A touch event may be assigned to the stamp. If a touch event is assigned, information about a touch operation such as tapping on the stamp or swiping can be acquired. When this information is used, an operation of moving the stamp or enlarging/reducing the stamp can be performed.

In step S604, the CPU 100 causes the interpreter 214 to interpret the contents of step S603, thereby adding the stamp to the drawing region 906.

[Printer Setting]

When the print button 905 shown in FIG. 9 is pressed, the processing in step S34 of FIG. 3 starts. Details of printer setting in step S34 of FIG. 3 will be described with reference to FIG. 7. Steps S701 and S709 to S711 are processes executed by the CPU 100 using the program of the script layer 217. Steps S702, S704, S705, S707, S708, and S712 are processes executed by the CPU 100 using the program of the native layer 218. Steps S703 and S706 are processes executed by the printer 112.

In step S701, in the script layer 217, the CPU 100 requests the native layer 218 to acquire printer information as device information. This is requested from the script layer 217 to perform communication with the printer 112. As the request method, an API unique to the native is called from the script by the binding function, as in image selection. In the native layer 218, a function which can directly be called from the script layer 217 or a so-called wrapper which indirectly calls the function is prepared in advance. For example, a native function GetPrinterInfo is prepared and called from the script side. In this way, the native layer 218 acquires the request of communication with the external device from the script layer 217.

Normally, the script layer 217 cannot directly communicate with the external device because of a restriction from the viewpoint of security. Therefore, the script layer 217 temporarily requests the native layer 218 to acquire external device information and communicates with the external device via the native layer 218. The native layer 218 has a function of communicating, via the OS layer 219, with the external device, for example, the printer 112.

In step S702, if the function is called in the native layer 218, the CPU 100 performs detection of a printer (so-called discovery) in the native layer 218. For example, a printer connected via the same wireless LAN router is detected. In this example, to detect a communicable printer, for example, the CPU 100 attempts to communicate with the printer 112 using a method such as broadcast or multicast by a protocol such as Bonjour®. In step S703, the printer 112 responds to the request from the native layer 218.

In step S704, in the native layer 218, the CPU 100 acquires the IP address of the printer 112 which has responded and stores it. In step S705, the CPU 100 requests the IP address of the printer 112 which has responded to provide printer information. If there exist a plurality of printers which have responded, the CPU 100 requests all the printers to provide information. To do this, in the native layer 218, the CPU 100 generates a command to acquire the information of the printer 112. This command is an instruction to designate the operation of the printer 112, and an example of the command described by XML is as follows.

```
01:   <?xml version="1.0" encoding="utf-8" ?>
02:   <cmd xmlns:trans="http://www.xxxx/yyyyy/">
03:       <contents>
04:           <operation>GetInformation</operation>
05:       </contents>
06:   </cmd>
```

A numerical value such as "01:" on the left side of each line is a line number added for the descriptive convenience, and is not described in an original text in the XML format. The first line is a header, and represents that the command is described in the XML format. On the second line, cmd represents the start of the command, and xmlns designates a name space and designates the definition of interpretation of the command. Note that on the sixth line, </cmd> represents the end of the command. The third line declares that the contents are described from there, and the fifth line represents the end. On the fourth line, the instruction to request is described, and an actual instruction word exists between <operation> and </operation>. The instruction word "GetInformation" is an instruction to acquire the information of a printer as an external device. For example, the instruction requests capability information such as the type and size of paper supported by the printer, the presence/absence of a borderless print function, and print quality.

Note that the printer information acquisition command may be generated by, for example, loading a permanent text stored in advance in the ROM 101. The format is not limited to a text format such as XML, and the command may be described in a binary format, and communication may be done by a protocol according to this. The generated printer information acquisition command is transmitted to the printer 112 via the external device communication unit 221 using a format complying with a communication protocol such as HTTP supported by the printer 112. The communication method is not limited to this. Connection using Wi-Fi® Direct, Bluetooth®, infrared communication, telephone network, wired LAN, or USB may be used. By performing communication by a protocol complying with the method, it is possible to obtain the same effects.

Figure 7:
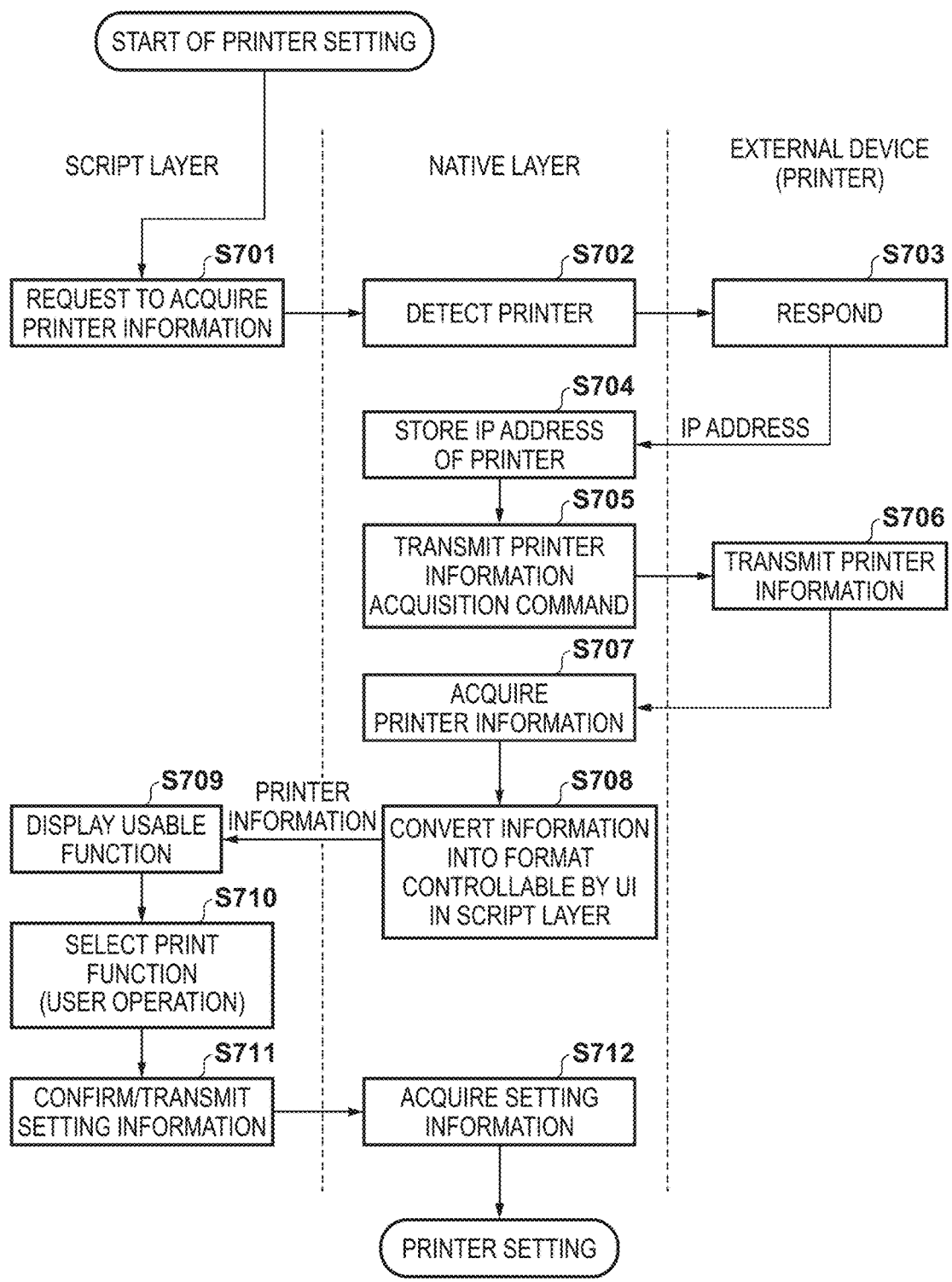
FIG. 7 is a flowchart illustrating printer setting processing.

FIG. 7 shows an arrangement which generates a command in the native layer 218. However, with an arrangement which generates a command in the script layer 217, it is possible to obtain the same effects. In this case, the script layer 217, for example, creates the command including the statement in the XML format and transfers it to the native layer 218. Upon receiving the command, the native layer 218 transmits the command to the printer 112 using the format complying with the communication protocol.

In step S706, upon receiving the command from the information processing apparatus 115, the printer 112 transmits the printer information as the device information to the information processing apparatus 115 using the XML format in accordance with the communication protocol. An example of the printer information is as follows.

```
01:   <?xml version="1.0" encoding="utf-8" ?>
02:   <cmd xmlns:trans="http://www.xxxx/yyyyy/">
03:       <contents>
04:           <device id="Printer001"/>
05:           <memory receive= 7680000/>
06:           <mode = 1>
07:               <media>GlossyPaper</media>
08:               <size>A4</size>
09:               <quality>1</quality>
10:               <border>no</border>
11:               <dpi x=1200 y=1200/>
12:           </mode>
13:           <mode = 2>
              ...
              </mode>
              <mode = 3>
              ...
              </mode>
              ...
       </contents>
   </cmd>
```

The first line is a header, and represents that the command is described in the XML format. On the second line, cmd represents the start of the command, and xmlns designates a name space and designates the definition of interpretation of the command. Note that on the last line, </cmd> represents the end of the command. The third line declares that the contents are described from there, and the contents continue up to </contents>. The fourth line represents a device ID. In this example, the model name of the printer 112 is "Printer001". The fifth line is not used in this embodiment and will be described later in another embodiment. On the sixth line and subsequent lines, the respective modes of the printer 112 are described. Information of one mode is described from <mode> to </mode>. On the sixth line, the mode number is 1. After that, <media> describes the type of printing paper, <size> describes the paper size, <quality> describes print quality, and <border> describes information of bordered/borderless printing. On the 11th line, <dpi> represents the output resolution. The resolution in the horizontal direction is 1,200 [dpi], and the resolution in the vertical direction is 1,200 [dpi].

On the 13th line and subsequent lines, information of mode 2 which is another mode is described. In this way, the model name of the printer 112 and all modes supported by the printer 112 are described. Note that the printer information description method is not limited to this, and may be implemented using a text which is not a tag format, or another format such as a binary format.

An example in which the information of the print function of the printer 112 is transferred has been described above. However, the present invention is not limited to this. For example, information representing image processing or analysis processing processable by the printer 112, the presence/absence of a silent print mode, the presence/absence of use of a memory card, a status such as a remaining ink amount, or the like may be transferred. Examples of the image processing are color conversion such as monochrome conversion, sepia conversion, and chroma enhancement, layout of a plurality of images, white balance correction, noise removal, and processing of automatically correcting a photo to a desired color or luminance.

In step S707, in the native layer 218, the CPU 100 acquires the printer information from the printer 112. In the native layer 218, the CPU 100 acquires, from the received printer information, for example, the items of the printing paper type and size, print quality, and bordered/borderless printing and the number of items in all the modes of the printer 112.

In step S708, in the native layer 218, the CPU 100 converts the received printer information into a format interpretable by the script layer 217 and transmits it to the script layer 217. That is, the CPU 100 transfers the information obtained by the communication with the printer 112 to the script layer 217. This is done by, for example, providing a native function and using the binding function. A method of transmitting the received printer information in the XML format or a method of converting the printer information into a text format without tags and then transmitting the information may be used. In addition, every time a specific native function is called from the script layer 217, information may be acquired as a return value. Alternatively, an argument such as a mode to be acquired may be passed to the native function, and information may be acquired as a return value. Furthermore, transfer using a JSON character string described above may be performed, or transfer using a character string such as BASE64 may be performed using the data conversion units 207 and 203.

In step S709, in the script layer 217, the CPU 100 generates and displays a setting screen shown in FIG. 10 including a function usable by the printer 112 based on the printer information received from the native layer 218. If there exist a plurality of connectable printers, the CPU 100 generates a display screen for displaying printer names and prompting the user to select a printer to print before the setting screen 1001 is displayed. Using printer information corresponding to the selected printer, the CPU 100 displays the setting screen of the selected printer. Note that printer selection is not limited to the above-described method, and a printer which has responded first, a printer having more functions, or a printer without congestion of print jobs may be selected.

As described above, the CPU 100 displays the setting screen 1001 for prompting the user to select the type and size of printing paper, print quality, and functions such as bordered/borderless printing usable by the printer 112. A sample of an XML description as an example of the setting screen generation method is as follows.

```
<!DOCTYPE html>
  <head>
    <title>print setting</title>
    <script>
      <!-- paper size -->
      var PaperSizeNum = GetPaperSizeNum( );
      var p = document.getElementById("PaperList");
      var i;
      for(i=0; i<PaperSizeNum; i++){
          p.options[i] = new Option(GetPaperSizeT(i),
      GetPaperSizeV(i));
      }
      <!-- paper type -->
      var MediaTypeNum = GetMediaTypeNum( );
      var m = document.getElementById("MediaList");
      var j;
      for(j=0; j<MediaTypeNum; j++){
          m.options[j] = new Option(GetMediaTypeT(j),
      GetMediaTypeV(j));
      }
      <!-- print quality -->
      var QualityNum = GetQualityNum( );
      var q = document.getElementById("QualityList");
      var k;
      for(k=0; k< QualityNum; k++){
          q.options[k] = new Option(GetQualityT(k),
      GetQualityV(k));
      }
      <!-- bordered/borderless -->
      var BorderNum = GetBorderNum( );
      var b = document.getElementById("BorderList");
      var l;
      for(l=0; l<BorderNum; l++){
          b.options[l] = new Option(GetBorderT(l),
      GetBorderV(l));
      }
      <!-- print function -->
      function printer( ) {
      SetPrint(document.getElementById("PaperList").value,
              document.getElementById("MediaList").value,
              document.getElementById("QualityList").value,
              document.getElementById("BorderList").value);
      }
    </script>
  </head>
  <!-- display unit -->
  <body>
    paper size <select id="PaperList"></select><br/>
    paper type <select id="MediaList"></select><br/>
    print quality <select
id="QualityList"></select><br/>
    bordered/borderless <select
id="BorderList"></select><br/>
    <br/>
    <button id="btn1" onclick="printer( )">setting
completion</button>
  </body>
</html>
```

In the above sample, GetPaperSizeNum( ), GetMediaTypeNum( ), GetQualityNum( ), and GetBorderNum( ) are native functions and have a function of acquiring the number of items. For example, if the printer supports four types of paper sizes A4, A5, B5, and L size, GetPaperSizeNum( ) returns "4".

GetPaperSizeT(n), GetMediaTypeT(n), GetQualityT(n), and GetBorderT(n) are native functions, each of which returns a character string corresponding to the value of an argument n as an ordinal number. For example, the return value of the function GetPaperSize(0) which returns the text of a paper size is "A4", and the return value of GetPaperSize (1) is "A5". These values are extracted by the native function from the printer information received from the printer.

GetPaperSizeV(n), GetMediaTypeV(n), GetQualityV(n), and GetBorderV(n) are native functions, each of which returns a character string corresponding to the value of the argument n as an ordinal number. For example, the return value of the function GetMediaTypeT(n) which returns the text of a paper type is a word like "glossy paper" which is displayed to the user. On the other hand, the return value of GetMediaTypeV(0) is an expression "GlossyPaper" interpretable by the printer.

The word or expression is decided by the native in association with the information sent from the printer 112. For example, if a value extracted from the information sent from the printer 112 is "GlossyPaper", the text to be displayed is decided as "glossy paper". As for the deciding method, for example, the native decides a text to be displayed, in accordance with a corresponding table held in advance.

Note that a specification which sets the paper size, paper type, print quality, and bordered/borderless printing has been described as an example. However, the present invention is not limited to this. As another example, other setting items such as double-sided/single-sided printing, color/monochrome printing, and on/off of image correction may be included. In addition, as described above, not only the print function but also information representing image processing or analysis processing processable by the printer 112, the presence/absence of a silent print mode, the presence/absence of use of a memory card, a status such as a remaining ink amount, or the like may be displayed.

In step S710, in the script layer 217, the CPU 100 selects a function to be set in the printer 112 based on a user operation on the setting screen 1001. The setting screen 1001 shown in FIG. 10 is an example in which the HTML data described above is displayed on the display 104 using the rendering unit 216. Printer information is requested via the native layer 218, and the setting screen 1001 is generated based on information acquired from the printer information using the above-described native functions. Note that the HTML data may be generated in either the script layer 217 or the native layer 218.

Each setting item such as the paper size shown in FIG. 10 uses a pull-down menu, and an item can be selected by a user operation. The setting screen 1001 shows a state in which a list of items selectable as the setting items of the paper size is displayed by a pull-down menu. Selection of a paper size such as A4 or A5 can be accepted by a user operation.

In step S711, upon detecting a user operation on the setting completion button 1002, the CPU 100 generates setting information including setting items selected by user operations and transmits it to the native layer 218 in the script layer 217. SetPrint( ) in the HTML description example described above is a native function with the binding function. In the above-described example, using SetPrint( ) the settings of the paper size, paper type, print quality, and bordered/borderless printing are transferred to the native layer 218 as character strings.

In step S712, in the native layer 218, the CPU 100 receives the setting information from the script layer 217 by the binding function. In the native layer 218, a print command is generated based on the received setting information in accordance with the communication protocol of the printer 112. The generated print command is transmitted to the printer 112 via the communication control unit 213.

[Rendering and Print]

When the setting completion button 1002 of the setting screen 1001 shown in FIG. 10 is pressed, the rendering and print processing in step S35 of FIG. 3 starts. Details of the rendering and print processing in step S35 of FIG. 3 will be described with reference to FIGS. 8A and 8B. In this embodiment, as for the rendering and print processing, assume that a description is made such that the processing is continued even if the application enters the background. For example, in iOS, the processing can be continued in the background using a function such as beginBackgroundTaskWithExpirationHandler.

In step S801, in the script layer 217, the CPU 100 transmits an indicator activation request to the OS layer 219. In step S802, in the OS layer 219, the CPU 100 displays an indicator.

In step S803, in the script layer 217, the CPU 100 transmits, to the native layer 218, a print content to be printed which has been used for UI display. Note that the processes executable in the script layer 217 as in steps S804, S805, and S806 may be executed in the script layer 217.

In this embodiment, the print content will be described using a SVG (Scalable Vector Graphics) content including one photo and one stamp as an example. A description example of the SVG content including one photo and one stamp is as follows.

```
<svg
xmlns="http://www.w3.org/2000/svg"
xmlns:xlink="http://www.w3.org/1999/xlink"
width="640" height="480" viewBox="0 0 640 480">
    <image width="640" height="480" x="0" y="0"
xlink:href="image data" id="image ID"></image>
    <image width="200" height="200" x="300"
height="50"
        xlink:href="designation of path of stamp"
id="stamp ID"></image>
</svg>
```

Rendering will be described below based on the above SVG description. However, the SVG description merely explains an outline, and a description of detailed settings is omitted.

In step S804, in the native layer 218, the CPU 100 acquires, from print information, an output resolution to be transmitted to the printer 112 and changes the SVG content to the size. For example, if the size of the output resolution acquired from the printer 112 is 4,000 px×3,000 px, the SVG content is rewritten as follows.

```
<svg
xmlns="http://www.w3.org/2000/svg"
xmlns:xlink="http://www.w3.org/1999/xlink"
width="4000" height="3000" viewBox="0 0 640 480">
    <image width="640" height="480" x="0" y="0"
xlink:href="image data" id="imageID"></image>
    <image width="200" height="200" x="300"
height="50" xlink:href="designation of path of stamp"
id="stamp ID"></image>
</svg>
```

The width and height of the SVG content are changed in accordance with the image size to be transmitted to the printer 112.

In step S805, in the native layer 218, the CPU 100 changes a description concerning the image of the SVG content to a description using a block image group. Assume that in steps S407 and S506, a block image group is created by dividing RGB data into an upper half and a lower half, which are saved to be accessible by "imageID_above.bmp" and "imageID_below.bmp". An SVG content obtained by changing the description concerning the image of the SVG content to a description using the above-described two block images is as follows.

```
<svg
xmlns="http://www.w3.org/2000/svg"
xmlns:xlink="http://www.w3.org/1999/xlink"
width="4000" height="3000" viewBox="0 0 640 480">
    <symbol id="imageID" viewBox="0 0 640 480">
        <image width="640" height="240" x="0" y="0"
xlink:href="imageID_above.bmp"></image>
        <image width="640" height="240" x="0" y="240"
xlink:href="imageID_below.bmp"></image>
    </symbol>
    <use xlink:href="#imageID" x="0" y="0"
width="640" height="480"/>
    <image width="200" height="200" x="300"
height="50" xlink:href="designation of path of stamp"
id="stamp ID"></image>
</svg>
```

In the above SVG content, the description portion concerning the image is changed to a description using the block image group. In the description using the block image group, a method of designating data saved in a file by a path or a method of including the entity of image data as BASE64 data may be used.

In step S806, in the native layer 218, the CPU 100 adds a specific marker element (to be referred to as a marker hereinafter) to the SVG content. In this embodiment, when drawing a print content, the CPU 100 specifies an element serving as a determination criterion for the print content to determine the timing of drawing completion. The marker specified in this embodiment is a red band, and is added to the right end of the SVG content. In this embodiment, a red band is used as an example. However, the marker is not limited to this, and any marker capable of discriminating added information can be used.

The SVG content with the added red band is as follows.

```
<svg
xmlns="http://www.w3.org/2000/svg"
xmlns:xlink="http://www.w3.org/1999/xlink"
width="4005" height="3000" viewBox="0 0 4005 3000">
    <svg width="4000" height="3000" viewBox="0 0 640 480">
        <symbol id="imageID" viewBox="0 0 640 480">
            <image width="640" height="240" x="0" y="0"
xlink:href="imageID_above.bmp"></image>
            <image width="640" height="240" x="0" y="240"
xlink:href="imageID_below.bmp"></image>
        </symbol>
        <use xlink:href="#imageID" x="0" y="0"
width="640" height="480"/>
        <image width="200" height="200" x="300"
height="50" xlink:href="designation of path of stamp"
id="stamp ID"></image>
    </svg>
    <rect x="4000" y="0" width="5" height="100%"
fill="red"/>
</svg>
```

In the above description, an SVG content indicating a region of 4,000 px×3,000 px serves as an SVG content indicating a region of 4,005 px×3,000 px. A region corresponding to the difference between these sizes serves as a region to add the red band. FIGS. 13A and 13B show an example of the SVG content with the added red band. The red band serving as the marker is added as the last element of the SVG content to execute drawing at last. The red band will be explained later concerning step S815.

In step S807, in the native layer 218, the CPU 100 determines whether the application is operating in the foreground or the background (determines a terminal state). In a mobile terminal, if an incoming call is received, or processing of activating another application is performed, the application under execution is made to operate in the background. If the application operating in the background continuously performs processing of heavy load, other applications may be influenced. To avoid this, in this embodiment, the CPU 100 determines the execution status of the application, and reduces the processing load of the application during the background state of the application. This operation will be described later.

In step S808, in the native layer 218, the CPU 100 creates an SVG content to render a specific unit region from the SVG content. In the application, if a region in the size of 4,000 px×3,000 px is rendered at once, the load on the memory increases. If this processing can be divided into two steps of rendering, for example, 4,000 px×1,500 px, the memory utilization can be reduced. The SVG content to render a specific unit region aims at this memory saving. The SVG content to render a specific unit region will be referred to as a band SVG content hereinafter. An explanation will be made concerning step S808 assuming that it is determined that the application is operating in the foreground.

In step S808, in the native layer 218, the CPU 100 creates, for example, the first band by a description below.

```
<svg
xmlns="http://www.w3.org/2000/svg"
xmlns:xlink="http://www.w3.org/1999/xlink"
width="4005" height="3000" viewBox="0 0 4005 3000">
<svg x="0" y="0">
<svg width="4000" height="3000" viewBox="0 0 640 480">
    <symbol id="imageID" viewBox="0 0 640 480">
        <image width="640" height="240" x="0" y="0"
xlink:href="imageID_above.bmp"></image>
        <image width="640" height="240" x="0" y="240"
xlink:href="imageID_below.bmp"></image>
    </symbol>
    <use xlink:href="#imageID" x="0" y="0"
width="640" height="480"/>
    <image width="200" height="200" x="300"
height="50" xlink:href="designation of path of stamp"
id="stamp ID"></image>
</svg>
<rect x="4000" y="0" width="5" height="3000"
fill="red"/>
</svg>
</svg>
```

In the above description, pieces of information to operate x- and y-coordinates are added to the SVG content. The region of SVG content to be drawn can be changed by changing the values of the x- and y-coordinates. In the first band, both the x- and y-coordinates are "0".

In step S809, in the native layer 218, the CPU 100 requests the OS layer 219 to generate a band size screen. In this embodiment, a region of 4,005 px×1,500 px is obtained from the first band SVG. This arrangement can reduce the memory utilization, as compared with a case in which the region of 4,005 px×3,000 px is rendered at once.

In step S810, in the OS layer 219, the CPU 100 executes generation of a band SVG screen (4,005 px×1,500 px). The screen region generated here serves as a drawing execution region. Information about the size of the band SVG content is held in not the band SVG content itself but the native layer 218. The screen is generated as an offscreen screen which is not displayed on the UI.

In step S811, in the native layer 218, the CPU 100 controls a drawing request to request the OS layer 219 to draw the first band SVG content on the screen generated in step S810. In step S812, in the OS layer 219, the CPU 100 loads the information of the band SVG content and executes drawing.

At the timing of loading the information of the band SVG content, the native layer 218 can receive a load completion notification. This notification can be made using a function provided in the OS as a standard function. In, for example, the Objective-C language used in creation of an iOS application, the webViewDidFinishLoad function corresponds to the function. In the Java language used in creation of an Android application, the onPageFinished function or the like corresponds to the function. This notification is made regardless of completion of drawing in step S812. At the timing when the native layer 218 receives this notification, drawing requested in step S811 may not have been completed.

In step S813, in the native layer 218, the CPU 100 requests image information from the OS layer 219. The image information is RGBA data displayed on the offscreen screen. In other words, step S813 means execution of screen capturing.

In step S814, in the OS layer 219, the CPU 100 executes screen capturing, and transmits the acquired RGBA data to the native layer 217. In this example, the information of 4,005 px×3,000 px is described in the band SVG content. However, the actual drawing execution region reserved in the OS layer 219 only has a size of 4,005 px×1,500 px. In this case, drawing is not executed for a portion off the reserved execution region. Thus, when the region of 4,005 px×1,500 px is reserved, only the upper half of the band SVG content is drawn. As a result, the native layer 218 can acquire only the information of the upper half. This method can acquire only the lower half of the SVG content by loading, to the region of 4,005 px×1,500 px, the following band SVG content in which the y-coordinate is changed.

```
<svg
  xmlns="http://www.w3.org/2000/svg"
  xmlns:xlink="http://www.w3.org/1999/xlink"
  width="4005" height="3000" viewBox="0 0 4005 3000">
  <svg x="0" y="-1500">
    <svg width="4000" height="3000" viewBox="0 0 640 480">
      <symbol id="imageID" viewBox="0 0 640 480">
        <image width="640" height="240" x="0" y="0"
  xlink:href="imageID_above.bmp"></image>
        <image width="640" height="240" x="0" y="240"
  xlink:href="imageID_below.bmp"></image>
      </symbol>
      <use xlink:href="#imageID" x="0" y="0"
  width="640" height="480"/>
      <image width="200" height="200" x="300"
  height="50" xlink:href="designation of path of stamp"
  id="stamp ID"></image>
    </svg>
    <rect x="4000" y="0" width="5" height="3000"
  fill="red"/>
  </svg>
</svg>
```

FIG. 12A shows an example in which the band SVG content is loaded to an execution region having a size smaller than that described in the SVG content. FIG. 12B shows an example in which y-coordinate is shifted and the band SVG content is loaded to the execution region having the size smaller than that described in the SVG content.

In step S815, in the native layer 218, the CPU 100 confirms whether the right end of the acquired RGBA data is red. The load completion information is sent from the OS layer 219 in step S812. This timing is not the timing of SVG drawing completion but the timing of SVG data load completion. That is, there is a time lag between the SVG data load completion and the drawing completion. If screen capturing is executed during this time, the desired image cannot be obtained. Therefore, the marker element of the red band to be drawn at last is added as a predetermined element to the SVG data to be loaded, and used as a criterion to determine whether drawing of the SVG content is complete.

In step S816, in the native layer 218, the CPU 100 determines whether the red band exists. If it is determined that no red band exists, the processes are repeated from step S813. In this case, the load on the CPU 100 may be reduced by repeating the processes from step S813 after a predetermined time elapses. If it is determined that the red band exists, the CPU 100 determines that the data acquired in step S815 serves as an output target (print target), and the process advances to step S817.

In step S817, in the native layer 218, the CPU 100 requests the OS layer 219 to reset the offscreen screen.

In step S818, in the OS layer 219, the CPU 100 discards the offscreen screen. There are two reasons why the screen is discarded. The first reason is that the screen is discarded to prevent the red band of the previous time from remaining at the time of next band SVG content loading and prevent the red band from being erroneously captured as data corresponding to a notification from the OS. However, instead of discarding the screen, the color or shape of the marker added for each band SVG content may be changed. When performing capturing, a native apparatus compares the color or shape of the marker added to data to be captured with that of the marker in the screen rasterized in the memory as a capturing target. As a result of the comparison, if the colors or shapes coincide with each other, the native layer may perform capturing; otherwise, no capturing may be performed.

The second reason why the screen is discarded in step S818 is that the size of the band SVG content may be dynamically changed. An example in which the size of the band SVG content is changed halfway through the processing will be described later.

Note that by discarding the screen in step S818, data is deleted from the memory area (for example, an area of a RAM 102) in which the OS layer performs drawing and from which the native layer acquires the drawn data. At this time, for example, all data in the memory area may be deleted or all drawn data may be deleted. Alternatively, the marker portion of the drawn data may be deleted.

In step S819, in the native layer 218, the CPU 100 converts the acquired RGBA data into JPEG data. The RGBA data sent in step S814 includes the information of degree of transparency (A) and the information of the red band, which are unnecessary in printing. JPEG conversion is executed so as to exclude the two pieces of information from the image to be printed.

In step S820, in the native layer 218, the CPU 100 adds, to the JPEG data generated in step S819, a print command to be transmitted to the printer 112. The print command added to the JPEG data is generated based on the information of printer settings. The print command is a command to control the printer 112, and includes information representing what is the ordinal position of the information to be transmitted as a band and footer information used to determine whether a band is the last band.

In step S821, in the native layer 218, the CPU 100 requests the OS layer 219 to transmit print information including the print command and JPEG data (output the print information to the printer). In step S822, in the OS layer 219, the CPU 100 transmits the print information received from the native layer 218 to the printer 112. After the transmission of the print information is completed, the process advances to step S824. In step S823, the printer 112 executes printing based on the print information received from the OS layer 219.

In step S824, in the native layer 218, the CPU 100 determines whether rendering has ended. The end of rendering is determined based on, for example, a fact that the sum of the heights of acquired images matches the height of the output size, a fact that a flag for end determination is set, or the like. This method is merely an example, and another determination method may be used. If it is determined that rendering has not ended, the processes are repeated from step S807.

If it is determined in step S824 that rendering has ended, the process advances to step S825, and the CPU 100 transmits an indicator stop request to the OS layer 219 in the script layer 217. In step S826, in the OS layer 219, the CPU 100 stops the indicator, and ends the processing of FIGS. 8A and 8B. In this example, rendering has ended for only the SVG content of 4,000 px×1,500 px of 4,000 px×3,000 px. Thus, the process returns from step S824 to step S807. The subsequent processing will be described below.

The following description assumes that it is determined in step S807 that the application is executed in the background. In the first band SVG content, the image is acquired in the size of 4,000 px×1,500 px. In this example, during execution in the background, it is important to reduce the memory utilization as much as possible, as described above.

In step S808, in the native layer 218, the CPU 100 receives the result of step S807, and executes the processes in step S808 and the subsequent steps. In this embodiment, the memory utilization is reduced by making the size of the band SVG content small. Therefore, assume that the second band has a size of 4,000 px×750 px, as an example. A description of the band SVG content in this case is as follows.

```
<svg
    xmlns="http://www.w3.org/2000/svg"
    xmlns:xlink="http://www.w3.org/1999/xlink"
    width="4005" height="3000" viewBox="0 0 4005 3000">
<svg x="0" y="-1500">
<svg width="4000" height="3000" viewBox="0 0 640 480">
<symbol id="imageID" viewBox="0 0 640 480">
    <image width="640" height="240" x="0" y="0"
xlink:href="imageID_above.bmp"></image>
    <image width="640" height="240" x="0" y="240"
xlink:href="imageID_below.bmp"></image>
    </symbol>
    <use xlink:href="#imageID" x="0" y="0"
width="640" height="480"/>
    <image width="200" height="200" x="300"
height="50" xlink:href="designation of path of stamp"
id="stamp ID"></image>
    </svg>
    <rect x="4000" y="0" width="5" height="3000"
fill="red"/>
    </svg>
</svg>
```

As described above, since drawing is executed in the region of the size reserved by the OS layer 219, the band SVG content itself can describe the information of 4,005 px×3,000 px. However, not to acquire the already acquired information again, the y-coordinate of the band SVG content needs to be changed appropriately. As the method of displaying a specific region of the SVG content, for example, a method of operating the attribute viewBox of the SVG content or the like may be used.

In step S809, in the native layer 218, the CPU 100 requests the OS layer 219 to generate an offscreen screen of a size (4,005 px×750 px) to acquire information.

In steps S810 to S823, the same processes as those described above are performed. In this example, in step S824, rendering of all the regions of the print content has not ended. The subsequent processing is the same as that described above, and a description thereof will be omitted.

As described above, according to this embodiment, it is possible to determine the timing of drawing completion of the SVG content to be rendered in the hybrid application.

Second Embodiment

In the first embodiment, upon completion of drawing of the band SVG content, processing of transmitting data of the band SVG content, drawing of which is complete, to the printer 112 is repeated. In this embodiment, data for which rendering of all band SVG contents is complete are transmitted to a printer 112 at once. As a result, the printer 112 starts printing after receiving all the data to be printed. Thus, it is possible to prevent printing from being interrupted due to communication disconnection caused by, for example, a time-out with an information processing apparatus 115 during printing.

Figure 14B:
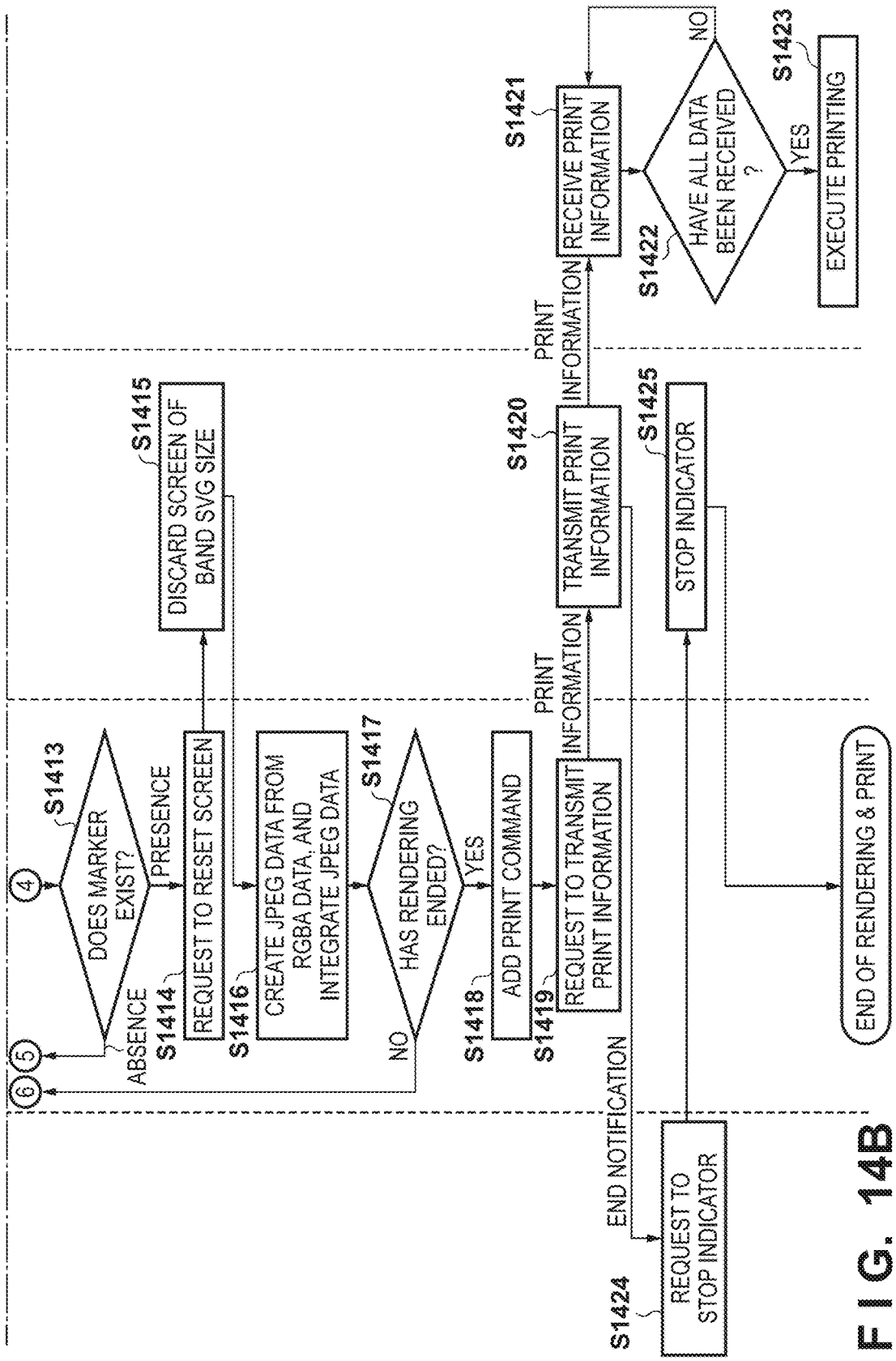

The difference from the first embodiment will be described below with reference to FIGS. 14A and 14B. Steps S1401 to S1404 are the same as steps S801 to S804 and a description thereof will be omitted.

In step S1405, in a native layer 218, a CPU 100 creates band SVG contents, and adds a marker to it. In this embodiment, for an SVG content of 4,000 px×3,000 px, two band SVG contents of 4,000 px×1,500 px are created. The two band SVG contents include a band SVG content added with a marker of a red band, and a band SVG content added with a marker of a blue band. Description examples of the two band SVG contents are as follows.

[First Band SVG Content]

```
<svg
    xmlns="http://www.w3.org/2000/svg"
    xmlns:xlink="http://www.w3.org/1999/xlink"
    width="4005" height="3000" viewBox="0 0 4005 3000">
<svg x="0" y="0">
<svg width="4000" height="3000" viewBox="0 0 640 480">
    <image xlink:href="image.bmp" x="0" y="0"
width="640" height="480"/>
    <image width="200" height="200" x="300"
height="50" xlink:href="designation of path of stamp"
id="stamp ID"></image>
    </svg>
    <rect x="4000" y="0" width="5" height="3000"
fill="red"/>
</svg>
```

[Second Band SVG Content]

```
<svg
    xmlns="http://www.w3.org/2000/svg"
    xmlns:xlink="http://www.w3.org/1999/xlink"
    width="4005" height="3000" viewBox="0 0 4005 3000">
<svg x="0" y="-1500">
<svg width="4000" height="3000" viewBox="0 0 640 480">
    <image xlink:href="image.bmp" x="0" y="0"
width="640" height="480"/>
    <image width="200" height="200" x="300"
height="50" xlink:href="designation of path of stamp"
id="stamp ID"></image>
```

-continued

```
    </svg>
    <rect x="4000" y="0" width="5" height="3000"
fill="blue"/>
    </svg>
</svg>
```

If the same marker is used in a plurality of band SVG contents, a previous marker may be erroneously acquired, and rendering completion may be erroneously recognized. In this embodiment, different markers are added, as described above, thereby making it possible to prevent erroneous recognition.

Steps S1406 to S1411 are the same as steps S809 to S814 and a description thereof will be omitted.

In step S1412, in the native layer 218, the CPU 100 confirms the marker. At this time, the native layer 218 needs to recognize the maker in the current band SVG content. To do this, marker information indicating the red band or blue band is read from the SVG description and separately managed in the native layer 218.

Steps S1413 to S1415 are the same as steps S816 to S818 and a description thereof will be omitted.

In step S1416, in the native layer 218, the CPU 100 creates JPEG data from acquired RGBA data. This operation is repeated the number of times which is equal to the number of band SVG contents, thereby creating one JPEG data. In this example, JPEG data of 4,000 px×3,000 px is generated, and corresponds to an SVG content to be printed.

Step S1417 is the same as step S824 and a description thereof will be omitted. If it is determined in step S1417 that rendering has ended, the process advances to step S1418; otherwise, the process returns to step S1405. Step S1418 is the same as step S820 and a description thereof will be omitted.

After the JPEG data of 4,000 px×3,000 px is generated, the CPU 100 adds, in step S1419, a print command necessary for printer control to the JPEG data in the native layer 218. In this embodiment, a print command capable of recognizing a mode in which printing is started after receiving all data is added. Although the mode in which printing is started after receiving all data is designated by the print command, the method is not limited to this. For example, a method of setting the mode by directly operating the main body of the printer 112 or a method of registering in advance arbitrary default settings by the user may be used. In step S1419, in the native layer 218, the CPU 100 transmits print information including the print command to the OS layer 219 together with a print information transmission request. In step S1420, in the OS layer 219, the CPU 100 transmits the print information to the printer 112.

In step S1421, the printer 112 acquires the print information. In step S1422, the printer 112 determines whether all pieces of information necessary for printing have been received. After determining in step S1422 that all the pieces of information necessary for printing have been received, the printer 112 executes printing in step S1423. If it is determined that not all the pieces of information necessary for printing have been received, the processing in step S1421 is repeated. By, for example, adding specific information indicating an end to the end of the data at the time of transmission in step S1420, it may be determined based on the information whether all the pieces of print information have been received. If, even after a predetermined time elapses, it is determined in step S1422 that not all the pieces of information necessary for printing have been received, the printer 112 may transmit a warning message to the information processing apparatus 115.

Steps S1424 and S1425 are the same as steps S825 and S826 and a description thereof will be omitted.

As described above, according to this embodiment, data for which rendering of all band SVG contents is complete are transmitted to the printer 112 at once. As a result, the printer 112 starts printing after receiving all the data to be printed. Thus, it is possible to prevent printing from being interrupted due to communication disconnection caused by, for example, a time-out with the information processing apparatus 115 during printing.

Third Embodiment

Figure 15A:
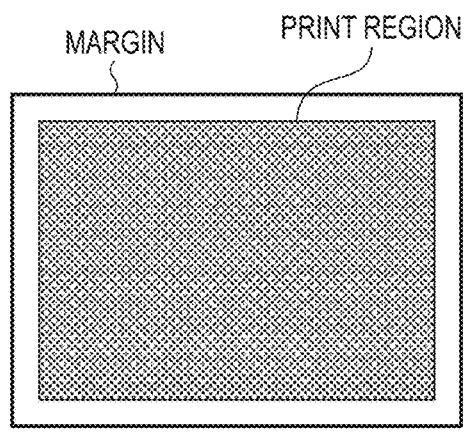
FIGS. 15A and 15B are views respectively showing bordered printing and borderless printing.
Figure 15B:
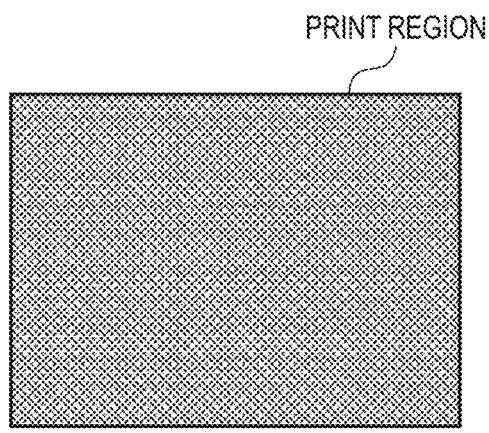
Figure 16:
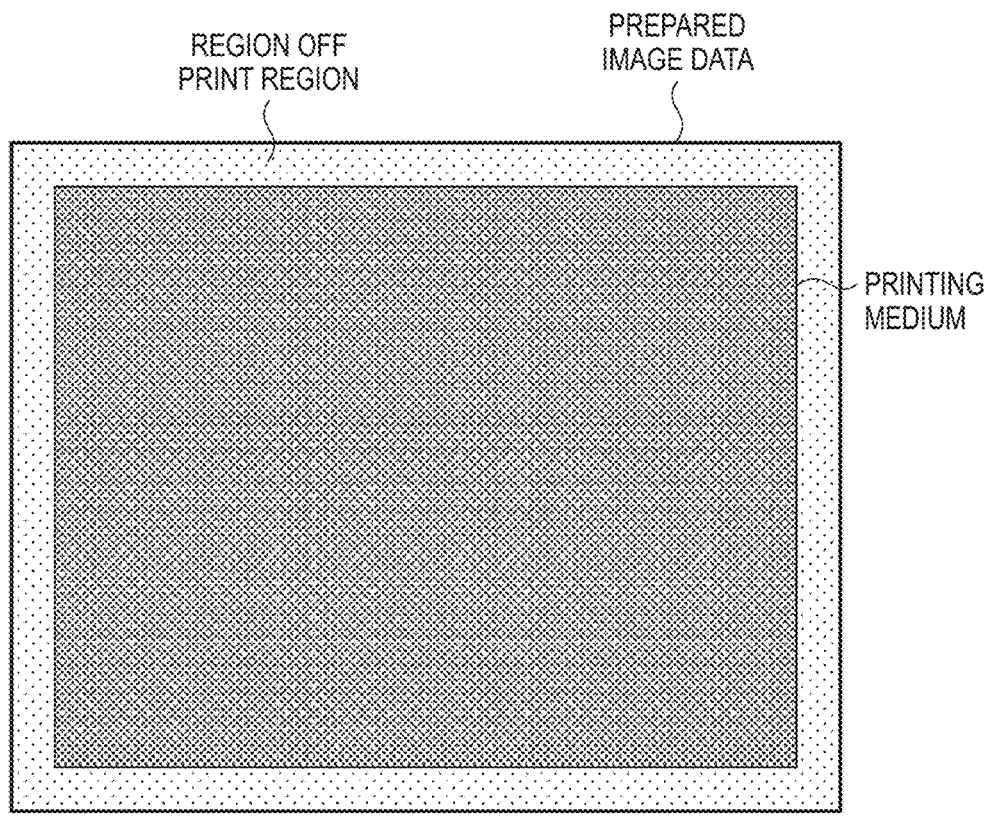
FIG. 16 is a view showing a print region in borderless printing.

In the first embodiment, a maker is added outside the print image region of the print content. On the other hand, in this embodiment, a marker is added in the print image region of a print content. A printer 112 may execute borderless printing. Borderless printing is printing in a state in which there is no margin in the periphery of a print image. FIGS. 15A and 15B respectively show an example of bordered printing and an example of borderless printing. As shown in FIG. 16, the printer 112 may perform borderless printing by enlarging the print image to a size larger than the size of a print target region on a printing medium (paper or the like) as a printing target, and setting part (the inside) of the print image as a print target. In borderless printing, as shown in FIG. 16, a marker can be arranged in a portion off the print target region within the print image region of the print content. For example, an SVG content when adding, to the SVG content, the red band added in step S806 is as follows.

```
<svg
xmlns="http://www.w3.org/2000/svg"
xmlns:xlink="http://www.w3.org/1999/xlink"
width="4000" height="3000" viewBox="0 0 640 480">
    <symbol id="imageID" viewBox="0 0 640 480">
        <image width="640" height="240" x="0" y="0"
xlink:href="imageID_above.bmp"></image>
        <image width="640" height="240" x="0" y="240"
xlink:href="imageID_below.bmp"></image>
    </symbol>
    <use xlink:href="#imageID" x="0" y="0"
width="640" height="480"/>
    <image width="200" height="200" x="300"
height="50" xlink:href="designation of path of stamp"
id="stamp ID"></image>
    </svg>
    <rect x="0" y="0" width="5" height="100%"
fill="red"/>
</svg>
```

There are two differences between the above SVG content and the SVG content when the red band is added in step S806. The first difference is that the SVG content has a size of 4,000 px×3,000 px, and can be reduced by the size of the marker according to this embodiment. The second difference is that the red band is added in the print image region of the SVG content. In the above example, a red band with a width of 5 px and a height of 3,000 px (designation of 100% of the height) is added at a position of an x-coordinate "0" and y-coordinate "0". However, the setting of the marker is not limited to this. When executing borderless printing, a marker may be added to any position in a region off the print target region. Whether to add a marker in the print image region of the print content may be determined based on information indicating whether bordered printing or borderless printing has been selected in user setting in step S34.

Fourth Embodiment

Figure 17A:
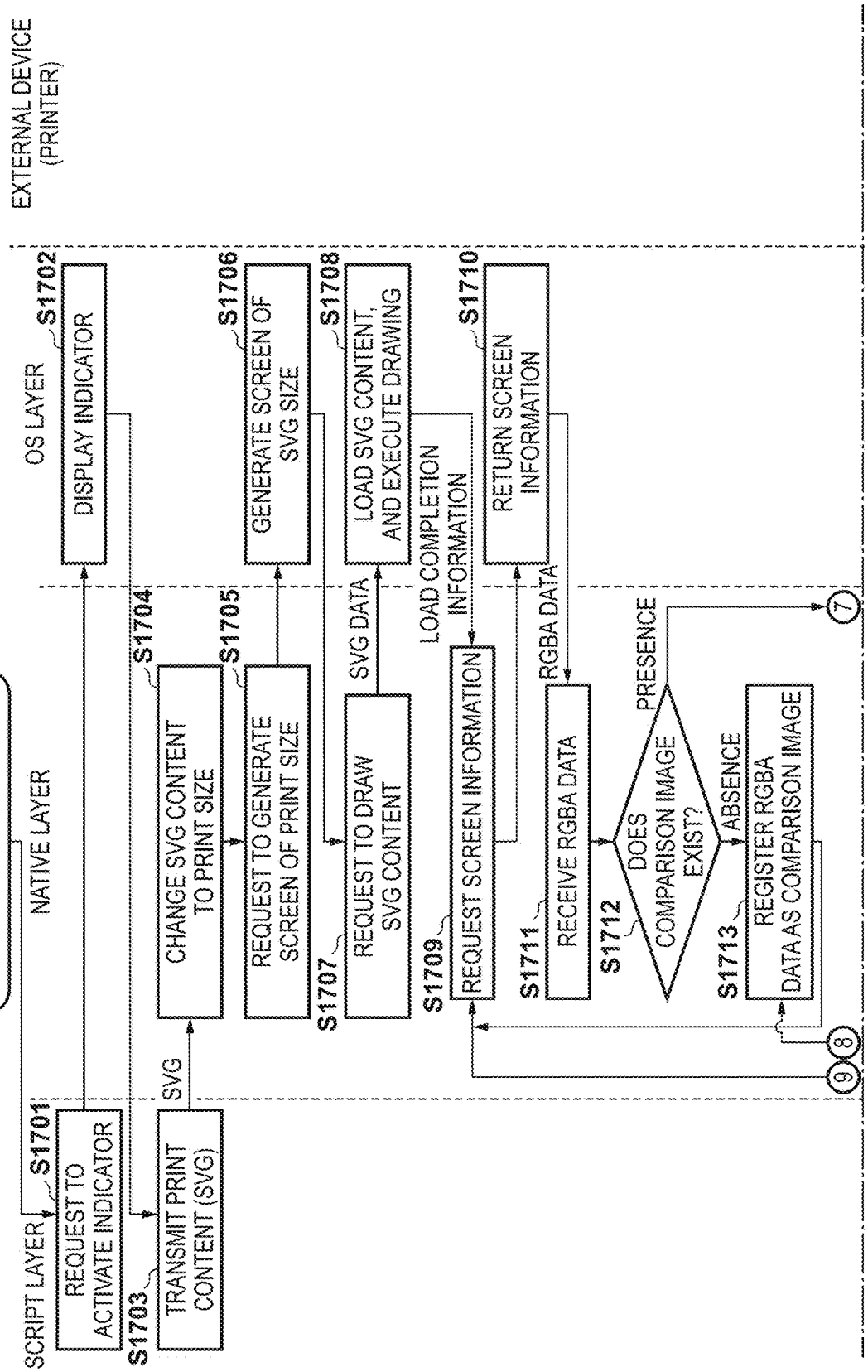
FIGS. 17A and 17B are flowcharts illustrating rendering and print processing.
Figure 17B:
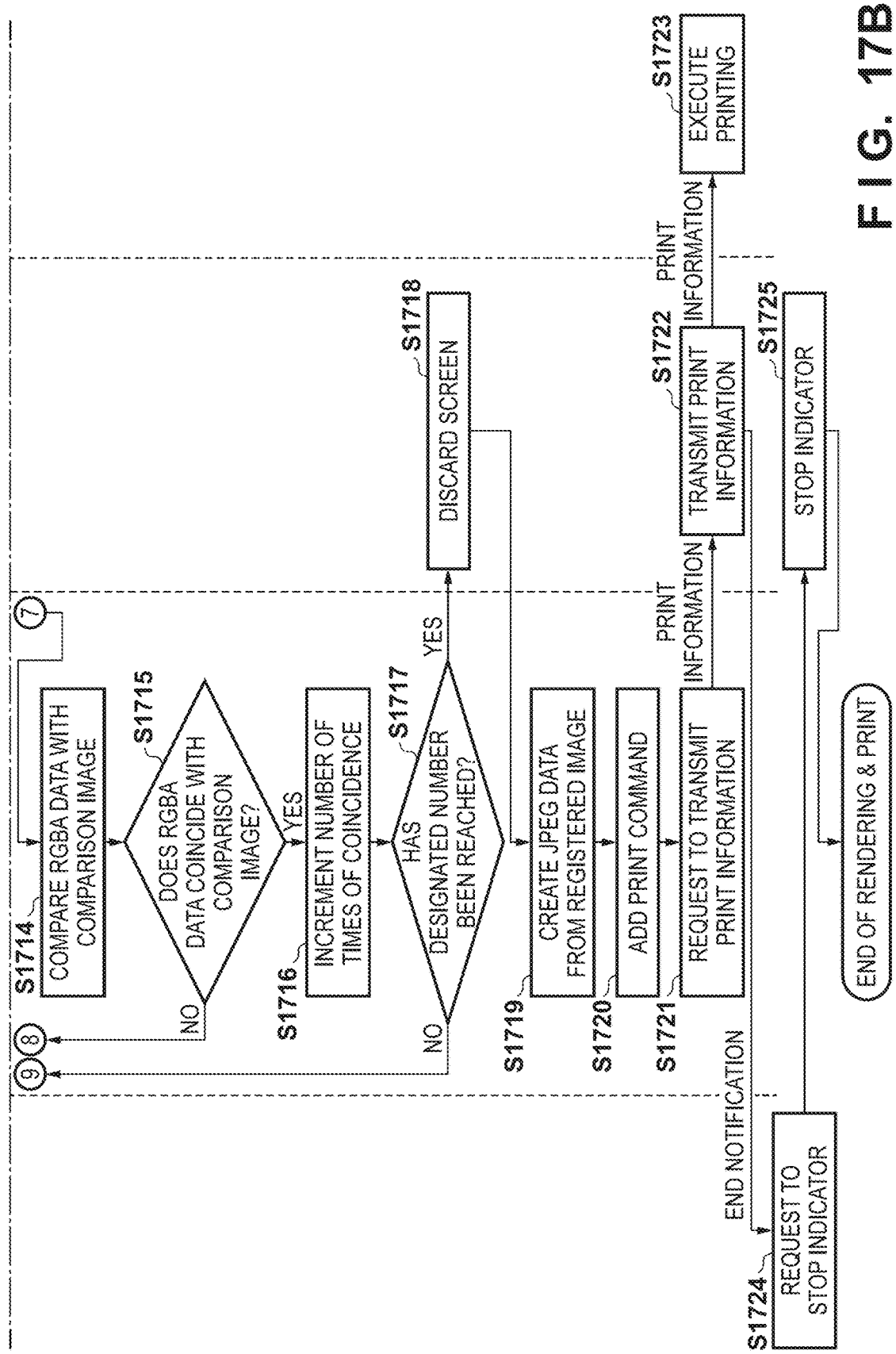

In this embodiment, instead of using the marker element described in the first to third embodiments, every time data (RGBA data) from an OS layer 219 is captured, contents are compared with previously acquired data, and if the contents remain the same, it is determined that rendering is complete. The difference from the above embodiments will be described below by referring to FIGS. 17A and 17B.

Steps S1701 to S1704 are the same as steps S801 to S804 and a description thereof will be omitted.

In step S1705, in a native layer 218, a CPU 100 requests the OS layer 219 to generate an offscreen screen of a print size changed in step S1704. In step S1706, in the OS layer 219, the CPU 100 generates an offscreen screen of the size designated in step S1705.

In step S1707, in the native layer 218, the CPU 100 requests the OS layer 219 to draw a SVG content of the print size on the offscreen screen reserved in step S1706. In step S1708, in the OS layer 219, the CPU 100 loads the SVG content from the native layer 218, thereby executing drawing. At this time, the native layer 218 receives load completion information at the timing when the OS layer 219 completes the load operation.

In step S1709, in the native layer 218, after receiving the load completion information, the CPU 100 requests screen information from the OS layer 219. The screen information is RGBA data drawn on the offscreen screen generated in step S1706. In step S1710, in the OS layer 219, the CPU 100 transmits the RGBA data to the native layer 218.

In step S1711, in the native layer 218, the CPU 100 receives the RGBA data from the OS layer 219. In step S1712, in the native layer 218, the CPU 100 determines whether a comparison image exists. The comparison image is, for example, RGBA data previously acquired from the OS layer 219. If it is determined that no comparison image exists, the process advances to step S1713; otherwise, the process advances to step S1714.

In step S1713, in the native layer 218, the CPU 100 saves, as a comparison image, in a data saving unit 220, the RGBA data acquired in step S1711. After that, the processes are repeated from step S1709. That is, if data is acquired from the OS layer 219 for the first time, the saving processing is performed. In this case, in step S1713, instead of saving the acquired RGBA data as a comparison image without any change, reduced RGBA data may be saved to shorten the comparison time in step S1715.

In step S1714, in the native layer 218, the CPU 100 determines whether the RGBA data received in step S1711 coincides with the RGBA data of the comparison image saved in step S1713. If it is determined that these data do not coincide with each other, the RGBA data received in step S1711 is registered as a comparison image (step S1713), and the processes are repeated from step S1709; otherwise, the process advances to step S1716.

In step S1716, in the native layer 218, the CPU 100 increments (adds one) a value representing the number of times of coincidence reserved in a memory area such as a RAM 102. Note that if it is determined in step S1715 that the data do not coincide with each other, the CPU 100 resets the value representing the number of times of coincidence.

In step S1717, in the native layer 218, the CPU 100 determines whether the value representing the number of times of coincidence has reached a designated number. If it is determined that the value has not reached the designated number, the processes are repeated from step S1709. When the process returns to step S1709, processing of standing by for a predetermined time may be performed. If it is determined that the value has reached the designated number, the process advances to step S1718. In step S1718, in the OS layer 219, the CPU 100 discards the offscreen screen.

Steps S1719 to S1726 are the same as steps S819 to S826 and a description thereof will be omitted.

As described above, in this embodiment, after data captured from the OS layer 219 is saved as a comparison image, the data is captured from the OS layer 219 again. Then, the data captured again is compared with the comparison image. If these data coincide with each other, it is determined that drawing is complete. In the first embodiment, a marker of a red band serving as a criterion to determine drawing completion is specified, and added outside the print image region of the print content. In the second embodiment, a marker of a different color is specified for each unit region of data, and added outside the print image region of the print content. In the third embodiment, a marker of a red band serving as a criterion to determine drawing completion is specified, and added outside the print target region in the print image region of the print content. In this embodiment, the print content itself is specified as an element serving as a criterion to determine drawing completion. In this embodiment, this arrangement makes it possible to determine the timing of drawing completion of an SVG content to be rendered, similarly to each embodiment described above.

Fifth Embodiment

In this embodiment, an element of a print content, which is drawn at last, is used as a marker. An SVG content according to this embodiment is as follows.

```
<svg id="SVG"
xmlns="http://www.w3.org/2000/svg"
xmlns:xlink="http://www.w3.org/1999/xlink"
width="640" height="480" viewBox="0 0 640 480">
<image width="640" height="480" x="0" y="0"
xlink:href="image.bmp"></image>
    <rect x="320" y="240" width="320" height="240"
fill="green"/>
</svg>
```

Figure 18:
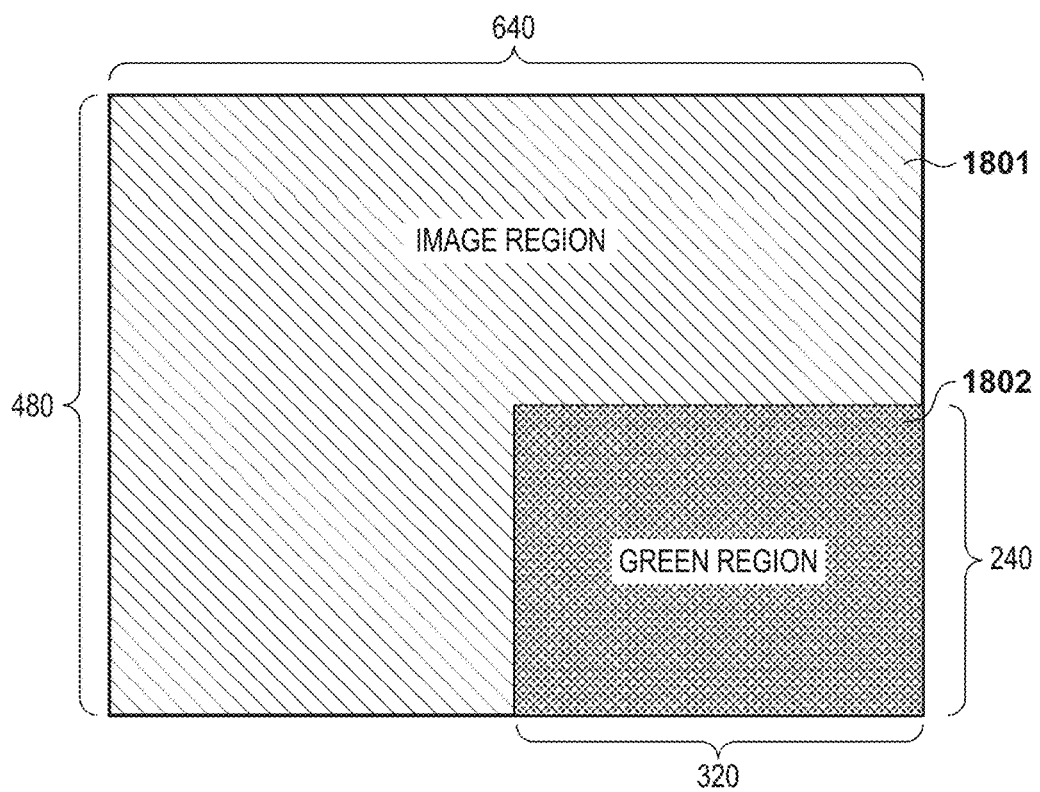
FIG. 18 is a view showing an SVG content.

The above SVG content shows an example in which a photo (image region) 1801 exists on the entire screen, as shown in FIG. 18. As shown in FIG. 18, a green quadrangular region 1802 with a width of 320 px and a height of 240 px is arranged at a position of an x-coordinate "320 px" and a y-coordinate "240 px".

When drawing the SVG content, the element described in <rect> is drawn at last. Therefore, in this embodiment, a CPU 100 specifies the last element <rect> in the drawing order as an element serving as a criterion to determine drawing completion. In the example of FIG. 18, the element drawn at last is the green quadrangular region. This element includes pieces of information respectively indicating "position", "size", and "color". Based on these pieces of information, a native layer 218 refers to a corresponding portion in the captured image, and determines, if the green quadrangular region of the predetermined size appears at the position, that drawing is complete.

Assume that a content of 640 px×480 px shown in FIG. 18 is enlarged by five times in the horizontal and vertical directions to obtain a content of 3,200 px×2,400 px. Since the position of the green quadrangular region serving as a marker is moved and the region is enlarged by five times in the horizontal and vertical directions, a green quadrangular region should appear in a region with a height of 1,600 px and a width 1,200 px by setting, as the origin, a position of an x-coordinate "1,600 px" and a y-coordinate "1,200 px". The native layer 218 can determine completion of drawing of the print content by determining whether the green quadrangular region exists in the above-described region.

Furthermore, the element drawn at last need not be a quadrangle. Any type of object such as a text or image may be used as long as it is possible to determine "position" and "information of the object which appears".

An SVG content when an image is an element drawn at last is as follows.

```
<svg id="SVG"
xmlns="http://www.w3.org/2000/svg"
xmlns:xlink="http://www.w3.org/1999/xlink"
width="640" height="480" viewBox="0 0 640 480">
<rect x="0" y="0" width="640" height="480"
fill="green"/>
<image width="320" height="240" x="320" y="240"
xlink:href="image.bmp"></image>
</svg>
```

Figure 19:
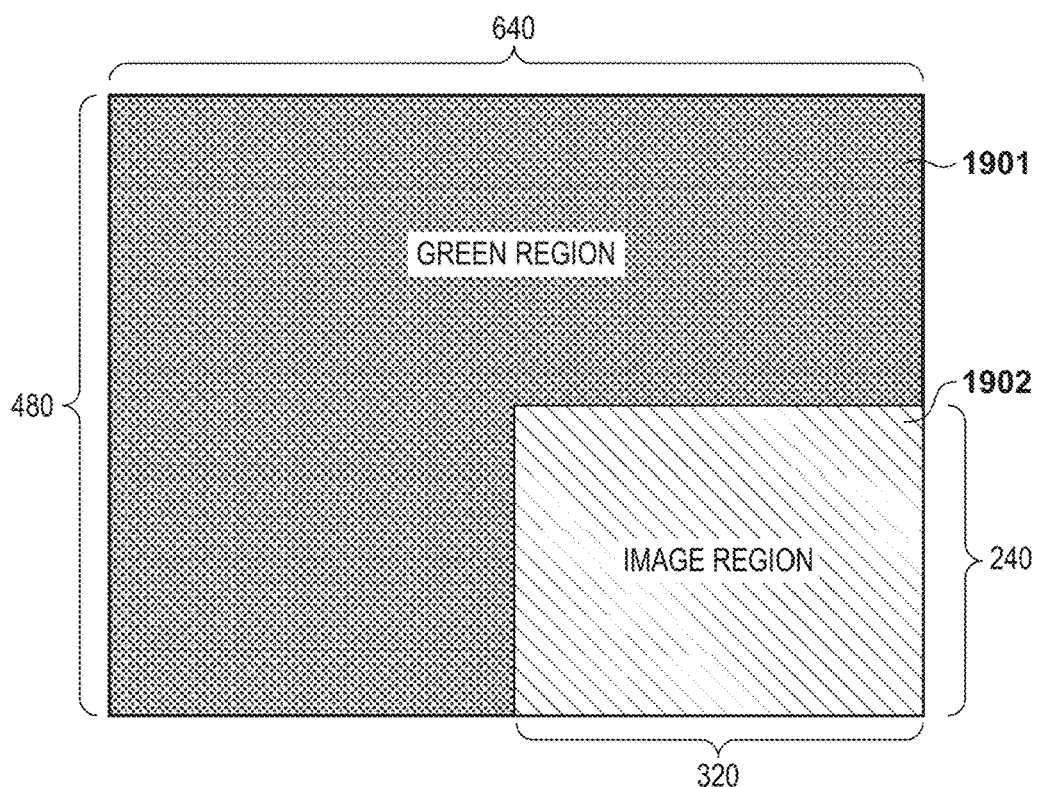
FIG. 19 is a view showing an SVG content.

The above SVG content is obtained by exchanging the position and size of the image region shown in FIG. 18 with those of the green quadrangular region shown in FIG. 18. FIG. 19 shows an example of drawing.

If the above SVG content is enlarged by five times in the horizontal and vertical directions to obtain a content of 3,200 px×2,400 px, it is calculated that the image region of 1,600 px×1,200 px appears by setting, as the origin, a position of an x-coordinate "1,600 px" and a y-coordinate "1,200 px". Since image data used as a print content is known to be "image.bmp", RGB data of "image.bmp" is acquired in advance, and an image region 1902 is magnified to RGB data of 1,600 px×1,200 px. RGB data of 1,600 px×1,200 px, which has, as the origin, a position of the x-coordinate "1,600 px" and the y-coordinate "1,200 px", is extracted from the captured image data, and then completion of drawing of the print content is determined by comparing the extracted data with the magnified RGB data. This determination processing may be performed by obtaining the differences between the pixel values of the two RGB data and determining whether the sum of the differences is equal to or smaller than a threshold.

As described above, it is possible to determine the timing of drawing completion of an SVG content to be rendered, by specifying, as a marker, an element which is drawn at last in the SVG content.

OTHER EMBODIMENTS

In the above-described embodiments, image acquisition is determined by detecting a marker. To the contrary, image acquisition may be determined using the disappearance of a marker.

That is, by arranging a marker in a portion where a content is to be rendered, the timing at which the marker cannot be detected any more can be determined as the timing of drawing completion. In this case, the marker need not be written at the end of the SVG content, and processing of enlarging a drawing region for the marker becomes unnecessary.

For example, consider a case in which the last element of an SVG content is an image (stamp), as follows.

```
<svg
xmlns="http://www.w3.org/2000/svg"
xmlns:xlink="http://www.w3.org/1999/xlink"
width="640" height="480" viewBox="0 0 640 480">
<image width="640" height="480" x="0" y="0"
xlink:href="image data" id="image ID"></image>
<image width="200" height="200" x="300"
height="50" xlink:href="designation of path of stamp"
id="stamp ID"></image>
</svg>
```

The following SVG content is obtained by adding a blue marker to the above SVG content. The blue marker is added immediately before the last element.

```
<svg
xmlns="http://www.w3.org/2000/svg"
xmlns:xlink="http://www.w3.org/1999/xlink"
width="640" height="480" viewBox="0 0 640 480">
<image width="640" height="480" x="0" y="0"
xlink:href="image data" id="image ID"></image>
<rect width="200" height="200" x="300"
height="50" fill="blue"/>
<image width="200" height="200" x="300"
height="50" xlink:href="designation of path of stamp"
id="stamp ID"></image>
</svg>
```

The blue marker is added at the same position as that of the last stamp image in the same size. If this SVG content is loaded, the region is blue or nothing is drawn until the last stamp image is drawn. Upon completion of drawing of the SVG data, the blue marker is overwritten with the last stamp image. Thus, in a state in which the region is not blue but something is drawn in the region where the marker is added, this can be determined as the timing of drawing completion. The blue marker has been exemplified above. In fact, however, it is desirable to use, as a maker, a color which is different from that of the stamp image by analyzing the image.

As described above, it is possible to detect drawing completion by a method of detecting the disappearance of a marker, instead of detecting the appearance of a marker.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-132015, filed Jul. 1, 2016, which is hereby incorporated by reference herein in its entirety.

What is claimed is:

1. An information processing method performed by executing, by at least one processor, an application program stored in a memory, comprising:
  instructing a drawing unit to draw a print target content and a predetermined element;
  acquiring drawn data from the drawing unit based on a notification from the drawing unit, which corresponds to the instructing and has been made regardless of completion of the drawing to the instructing;
  causing, if the acquired data includes data corresponding to the predetermined element, a print apparatus to execute printing based on the acquired data; and
  acquiring, if the acquired data includes no data corresponding to the predetermined element, data from the drawing unit again without causing the print apparatus to execute printing based on the acquired data.

2. The method according to claim 1, wherein the application program includes a first layer formed by a script instruction which is translated to be executable by the at least one processor and executed at the time of execution of an application, and a second layer formed by an instruction which is translated in advance and is executable by the processor.

3. The method according to claim 2, wherein
  by executing a program corresponding to the first layer of the application program, the at least one processor instructs the drawing unit to perform the drawing, and
  by executing a program corresponding to the second layer of the application program, the at least one processor acquires drawn data from the drawing unit in response to the notification, and causes the print apparatus to execute the printing.

4. The method according to claim 1, wherein if the acquired data includes data corresponding to the predetermined element, the at least one processor causes the print apparatus to execute printing based on the acquired data, and executes processing for deleting the data from the drawing unit.

5. The method according to claim 1, wherein the predetermined element is an element which is drawn at last when the drawing unit performs the drawing.

6. The method according to claim 1, wherein by executing the application program, the at least one processor executes processing for adding the predetermined element to the print target content.

7. The method according to claim 6, wherein
  the at least one processor
  executes processing for adding the predetermined element outside the print target content, and
  causes the print apparatus to execute printing of the print target content without causing the print apparatus to execute printing of the predetermined element.

8. The method according to claim 6, wherein the at least one processor executes processing for adding the predetermined element inside the print target content.

9. The method according to claim 8, wherein
  if the print target content is enlarged to a size larger than a size of a print target region on a printing medium and printed,
  the at least one processor executes processing for adding the predetermined element to a portion different from a print target portion of the print target content to the print target region.

10. The method according to claim 1, wherein the at least one processor causes the drawing unit to execute drawing for each unit region of the print target content, and instructs the drawing unit to draw the predetermined element different for each unit region.

11. The method according to claim 1, wherein
  the at least one processor causes the drawing unit to execute drawing for each unit region of the print target content, and
  the drawing unit reserves an execution region of the drawing corresponding to a size of the unit region, and executes drawing for the unit region of the content in the reserved execution region.

12. The method according to claim 11, wherein the drawing unit changes the size of the execution region of the drawing in accordance with an execution status of the application program.

13. The method according to claim 12, wherein if the application program is executed in the background, the drawing unit decreases the execution region of the drawing.

14. The method according to claim 1, wherein
  the at least one processor requests the drawing unit to draw the print target content as the predetermined element, and
  determines coincidence of the acquired data and the print target content.

15. The method according to claim 1, wherein if the acquired data includes no data corresponding to the predetermined element, the at least one processor repeats the acquisition until drawn data including the data corresponding to the predetermined element is acquired.

16. The method according to claim 1, wherein the drawing unit draws the print target content and the predetermined element to overwrite a previously drawn print target content.

17. The method according to claim 1, wherein the at least one processor generates the print target content by SVG (Scalable Vector Graphics) by executing the application program.

18. The method according to claim 1, wherein the at least one processor serves as the drawing unit to draw the print target content by executing an OS.

19. An information processing apparatus comprising:
  at least one processor; and
  a memory configured to store an application program,
  wherein by executing the application program, the at least one processor
  instructs a drawing unit to draw a print target content and a predetermined element,
  acquires drawn data from the drawing unit based on a notification from the drawing unit, which corresponds to the instructing and has been made regardless of completion of the drawing to the instructing,
  causes, if the acquired data includes data corresponding to the predetermined element, a print apparatus to execute printing based on the acquired data, and acquires, if the acquired data includes no data corresponding to the predetermined element, data from the drawing unit again without causing the print apparatus to execute printing based on the acquired data.

20. A non-transitory computer-readable storage medium storing a program for causing a computer including at least one processor and a memory configured to store an application program, to:

when the at least one processor executes the application program, instruct a drawing unit to draw a print target content and a predetermined element, acquire drawn data from the drawing unit based on a notification from the drawing unit, which corresponds to the instructing and has been made regardless of completion of the drawing to the instructing, cause, if the acquired data includes data corresponding to the predetermined element, a print apparatus to execute printing based on the acquired data, and acquire, if the acquired data includes no data corresponding to the predetermined element, data from the drawing unit again without causing the print apparatus to execute printing based on the acquired data.

* * * * *